United States Patent
Kinugasa et al.

(10) Patent No.: US 11,759,953 B2
(45) Date of Patent: Sep. 19, 2023

(54) ENCODER ABNORMALITY DETECTING METHOD, OPERATION CONTROL DEVICE, ROBOT, AND ROBOT SYSTEM

(71) Applicant: Panasonic Intellectual Property Management Co., Ltd., Osaka (JP)

(72) Inventors: Yasuhiro Kinugasa, Osaka (JP); Atsumi Hashimoto, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 544 days.

(21) Appl. No.: 17/096,180

(22) Filed: Nov. 12, 2020

(65) Prior Publication Data
US 2021/0060784 A1 Mar. 4, 2021

Related U.S. Application Data

(63) Continuation of application No. PCT/JP2019/005304, filed on Feb. 14, 2019.

(30) Foreign Application Priority Data

May 16, 2018 (JP) .............................. 2018-094548

(51) Int. Cl.
*B25J 9/18* (2006.01)
*B25J 9/16* (2006.01)
(Continued)

(52) U.S. Cl.
CPC ........... *B25J 9/1674* (2013.01); *B25J 9/1651* (2013.01); *B25J 13/085* (2013.01); *B25J 13/088* (2013.01); *G05B 19/4062* (2013.01)

(58) Field of Classification Search
USPC .................................................. 318/568.11
See application file for complete search history.

(56) References Cited

U.S. PATENT DOCUMENTS 6,218,801 B1 * 4/2001 Brogårdh ............... B25J 9/1674
318/568.22
9,205,560 B1 * 12/2015 Edsinger ............... B25J 9/1674
(Continued)

FOREIGN PATENT DOCUMENTS

JP 03-223907 10/1991
JP 10-315173 12/1998
(Continued)

OTHER PUBLICATIONS

Extended European Search Report dated Jun. 11, 2021 in corresponding European Patent Application No. 19803677.4.
(Continued)

*Primary Examiner* — Kawing Chan
*Assistant Examiner* — Gabriel Agared
(74) *Attorney, Agent, or Firm* — Wenderoth, Lind & Ponack, L.L.P.

(57) ABSTRACT

An abnormality detection method for detecting an abnormality of an encoder provided for a robot includes: obtaining corrected position information according to commanded position information output from a controller that designates the rotational position of a motor and an output signal output from the encoder; and, determining, after comparing the corrected position information with the detected position information according to the output signal output from the encoder, the abnormality of the encoder, if there is a difference greater than or equal to a predetermined value between the corrected position information and the detected position information. The controller removes a vibration component of the robot corresponding to the weight of an attachment load from the commanded position information and compensates for a time delay to obtain the corrected position information.

13 Claims, 14 Drawing Sheets

(51) Int. Cl.
*B25J 13/08* (2006.01)
*G05B 19/4062* (2006.01)

(56) References Cited

U.S. PATENT DOCUMENTS

| | | | |
|---|---|---|---|
| 10,493,626 B2* | 12/2019 | Sato | B25J 13/087 |
| 2009/0259340 A1* | 10/2009 | Umemoto | G05B 19/4062 |
| | | | 700/275 |
| 2011/0202308 A1 | 8/2011 | Kishida et al. | |
| 2011/0221377 A1 | 9/2011 | Ueno | |
| 2015/0142377 A1 | 5/2015 | Kishida et al. | |
| 2016/0231728 A1* | 8/2016 | Munz | B25J 9/1674 |
| 2020/0047344 A1 | 2/2020 | Kinugasa et al. | |

FOREIGN PATENT DOCUMENTS

| | | |
|---|---|---|
| JP | 2013-000833 | 1/2013 |
| JP | 5367623 | 12/2013 |
| JP | 5675761 | 2/2015 |
| WO | 2012/149446 | 11/2012 |
| WO | 2018/079075 | 5/2018 |

OTHER PUBLICATIONS

International Search Report dated Apr. 16, 2019 in International (PCT) Application No. PCT/JP2019/005304 with English translation.

* cited by examiner

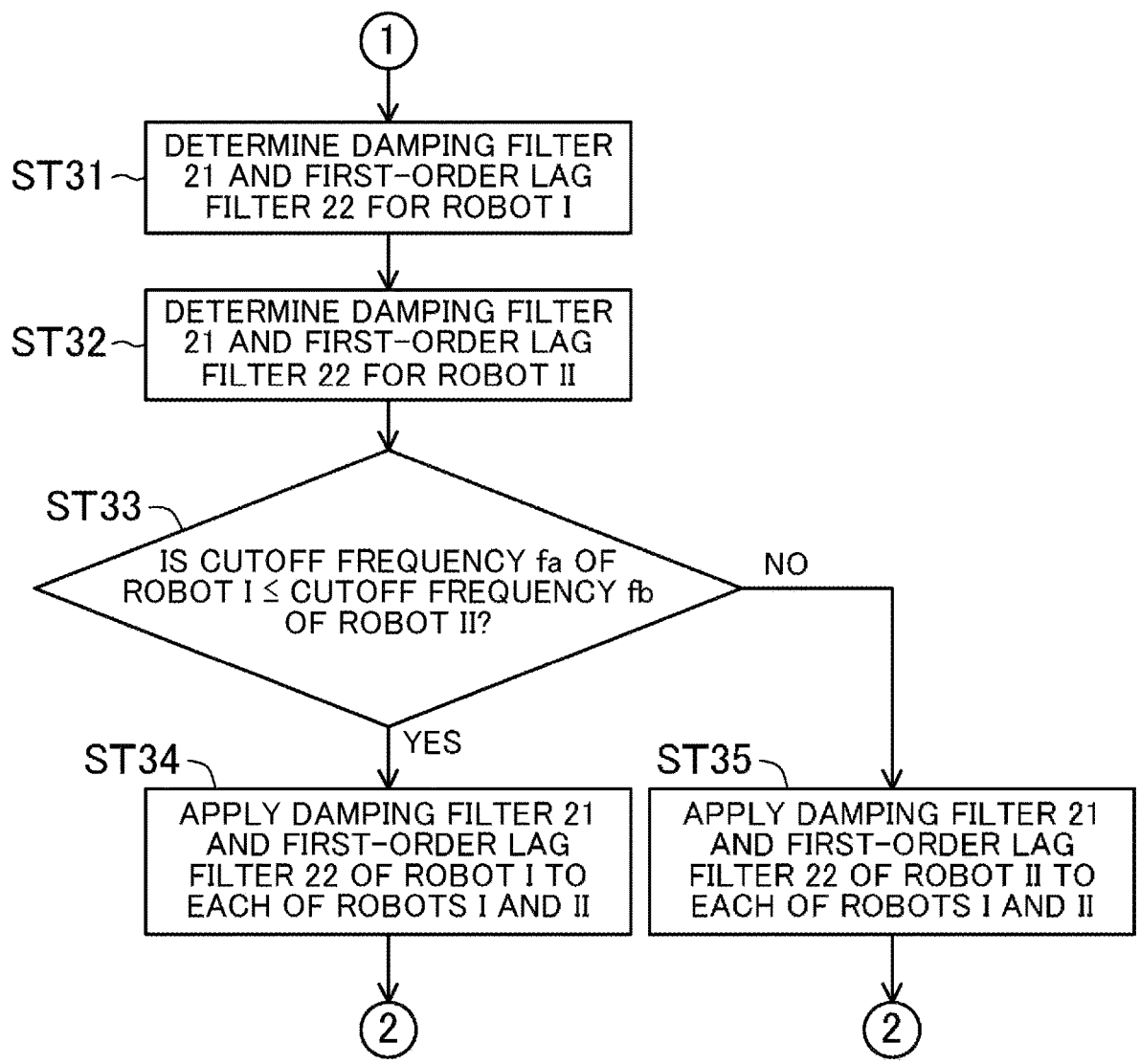

ENCODER ABNORMALITY DETECTING METHOD, OPERATION CONTROL DEVICE, ROBOT, AND ROBOT SYSTEM

CROSS-REFERENCE TO RELATED APPLICATIONS

This is a continuation of International Application No. PCT/JP2019/5304 filed on Feb. 14, 2019, which claims priority to Japanese Patent Application No. 2018-094548 filed on May 16, 2018. The entire disclosures of these applications are incorporated by reference herein.

BACKGROUND

The present disclosure relates to an abnormality detection method for detecting an abnormality of an encoder, and more particularly, to an abnormality detection method for detecting an abnormality of an encoder for sensing the rotational position of a motor related to drive of an output shaft of an operation system such as a robot, an operation control device with an abnormality detection function, the robot, and a robot system.

An abnormality detection technique is known which is related to a malfunction of an encoder used for sensing the rotational position of a motor that drives an output shaft of an operation system such as a robot.

Japanese Patent No. 5675761 discloses a technique of determining an abnormality of an encoder, if there is a certain difference or more between measured values of positions detected by two encoders. A first encoder senses the rotation of an input shaft of a motor, whereas a second encoder senses the rotation of an output shaft of the motor.

Japanese Patent No. 5367623 discloses a servo system including a safety unit that monitors whether or not a motor is being normally controlled. The safety unit according to Japanese Patent No. 5367623 generates a stop signal to be output to the servo driver, if a command value or a feedback value is abnormal which is received from the servo driver controlling the motor.

SUMMARY

However, most of drive systems (e.g., motors) of general-purpose operation systems include only a single encoder. The technique disclosed in Japanese Patent No. 5675761 is thus not applicable to these general-purpose motors. In addition, in order to newly configure the system according to Japanese Patent No. 5675761, a plurality of sensors are required, which increases the costs.

Also in the technique disclosed in Japanese Patent No. 5367623, the servo driver requires an additional function so as to be applied to a general-purpose system without any abnormality detection function. That is, both the servo driver and the safety unit need to be developed. In other words, an increasing number of steps are required.

For example, assume that the configuration described in Japanese Patent No. 5367623 is applied to a general-purpose robot including no device for detecting an abnormality of an encoder. The servo driver of the general-purpose robot usually has no function of generating commanded motor values and detected motor values or outputting the generated commanded motor values and the detected motor values.

There is thus a need for newly designing a circuit or a program, for example, with the generating and outputting functions mentioned above. In addition, a mechanism (e.g., a circuit, a program, or a display) is required which indicates whether or not the additionally designed circuit or program is functioning properly. Thus, this disadvantageously involves increase in time and effort and a complicated process.

In addition, during an operation of a robot, unintended vibrations may occur. This is because a robotic arm operates at a frequency closer to the natural frequency of the robot. The robot is usually operated out of a predetermined frequency band including this natural frequency. Alternatively, the robotic arm is driven after removing a component of the frequency band (hereinafter may be referred to as a "vibration component") contained in the speed command, for example, for operating the robot, using a filter or any other element. In addition, the natural frequency of the robot may vary from the initial value under the influence of the load on the robotic arm or an attachment mechanism attached to the robotic arm. By switching filter constants in accordance with the weight of the load, for example, the vibration component is properly removed from the speed command to be transmitted to the servo driver.

However, such the switch between the filter constants is usually not performed for the information transmitted to the safety unit. The safety unit may thus erroneously detect an abnormality of the encoder upon switching of the filter constants in the servo driver.

The present disclosure was made in view of the problems. It is an objective of the present disclosure to provide an abnormality detection method for detecting an abnormality of an encoder, an operation control device, a robot, and a robot system, while achieving the following. Under a reduced influence on the existing system, the method, the device, the robot, and the robot system are applicable to a system employing a general encoder and reduces the influence of the attachment load on the robot.

Disclosed herein is an abnormality detection method for detecting an abnormality of an encoder for sensing a rotational position of a motor that drives an output shaft of an operation system, using: a controller configured to output a speed command designating a rotational position of the motor, and commanded position information indicating the rotational position of the motor according to the speed command; a driver configured to receive the speed command output from the controller and an output signal output from the encoder, and to control drive of the motor based on the speed command and the output signal; and an abnormality detection device configured to detect the abnormality of the encoder. The method includes: using the abnormality detection device, obtaining corrected position information from the controller and the output signal from the encoder, the corrected position information being obtained by removing a vibration component of the operation system and compensating for a time delay caused by a delay in drive control of the motor; and determining, after comparing the corrected position information with detected position information on the motor calculated based on the output signal, if there is a difference greater than or equal to a predetermined value between the corrected position information and the detected position information. The controller removes, from the commanded position information, the vibration component corresponding to a weight of an attachment load held by the operation system, and compensates for the time delay to obtain the corrected position information.

With this method, the abnormality detection device determines the abnormality of the encoder based on the result of the comparison between the corrected position information and the detected position information. The corrected position information is based on the commanded position information received from the controller and obtained by reducing the influence of the vibration component or the control delay. The detected position information is calculated based on the output signal from the encoder. This allows detection of the abnormality of the encoder without adding, to the driver, any additional configuration or function for detecting the abnormality of the encoder. That is, the abnormality of the encoder can be detected with the influence on the existing configuration or circuit of a general operation system (e.g., a robot or an external shaft), for example, reduced as much as possible. In addition, this method reduces erroneous detection in the encoder and detects the abnormality of the encoder at a high accuracy. The correction corresponding to the weight of the attachment load held by the operation system is made to the commanded position information to be received by the abnormality detection device. This reduces erroneous detection of the abnormality of the encoder by the abnormality detection device and improves the accuracy in detecting the abnormality of the encoder.

The method may further include: using the controller, detecting a switch between drive control modes of the operation system; and switching processing routes for the commanded position information in accordance with the switch between the drive control modes. The abnormality detection device may receive the commanded position information that has been processed through one of the processing routes corresponding to a selected one of the drive control modes, or the corrected position information.

This method reduces the error between the commanded position information or the corrected position information and the detected position information according to the difference in the drive control modes of the operation system, and improves the accuracy in detecting the abnormality of the encoder.

An amount of compensation for the time delay of the commanded position information and an amount of compensation for the time delay of the corrected position information may vary depending on the switch between the processing routes.

The method may further include: using the controller, detecting a switch between drive control modes of the operation system; switching processing routes for the commanded position information in accordance with the switch between the drive control modes; processing the commanded position information output from the controller through a first processing route corresponding to a detected actual drive control mode; processing, as the commanded position information, position information corresponding to an original position of the motor through a second processing route not corresponding to the detected actual drive control mode; and summing up the commanded position information processed through the first processing route and the corrected position information, and summing up the commanded position information processed through the second processing route and the corrected position information. The abnormality detection device may receive the commanded position information and the corrected position information summed up in the summing.

In this method, the drive control modes of the operation system are switched. This absorbs the difference in the response delay caused by the difference in the processing modes, even if the processing route for the commanded position information is different, and reduces the difference between the commanded motor position and the detected motor position, which leads to improvement of the accuracy in detecting the abnormality of the encoder.

The method may further include: compensating for the time delay of the commanded position information through at least one of the first processing route or the second processing route. Feed forward control may be performed in the compensating.

This method further reduces the error in compensating for the time delay and the difference between the commanded motor position and the detected motor position, which leads to improvement of the accuracy improves in detecting the abnormality of the encoder.

A safety circuit may be further used for an emergency stop of the operation system. The controller may transmit an emergency stop signal to the safety circuit in an emergency. In the determining of the abnormality, the abnormality detection device may determine no abnormality of the encoder upon detection of an output of the emergency stop signal output from the controller, even if there is a difference greater than or equal to the predetermined value between the corrected position information and the detected position information.

According to this method, after the controller has output the emergency stop signal, no abnormality of the encoder is determined, even if there is a difference equal to or greater than the predetermined value between the commanded position information or the corrected position information and the detected position information. This hinders determination on an abnormality of the encoder which is operating normally if, for example, the output of the speed command and the commanded position information is stopped after the controller has output the emergency stop signal.

Disclosed herein is an operation control device for controlling a motor that drives an output shaft of an operation system. The device includes: a controller configured to output a speed command designating a rotational position of the motor, and commanded position information indicating the rotational position of the motor according to the speed command; a driver configured to receive the speed command output from the controller and an output signal output from an encoder for sensing the rotational position of the motor, and to control drive of the motor based on the speed command and the output signal; an abnormality detection device configured to detect an abnormality of the encoder; a damping filter for removing a vibration component of the operation system from the commanded position information; a delay control filter for compensating the commanded position information for a time delay caused by a delay in drive control of the motor; the damping filter including a set of a plurality of damping filters with filter constants different from each other; the delay control filter including a set of a plurality of delay control filters with time constants different from each other; the controller including an applicable damping filter determiner configured to select one of the plurality of damping filters which has one of the filter constants corresponding to a weight of an attachment load held by the operation system; and the abnormality detection device including a first receiver configured to receive the output signal from the encoder, a second receiver configured to receive the commanded position information from the controller or receive corrected position information via the one of the damping filters selected by the applicable damping filter determiner and the delay control filter; and a determiner configured to compare the corrected position information with detected position information on the motor calculated based on the output signal, and determine that the encoder has the abnormality, if there is a difference greater than or equal to a predetermined value between the corrected position information or the commanded position information and the detected position information.

Like the abnormality detection method described above, this configuration allows for detection of the abnormality of the encoder without adding, to the driver, any additional function for detecting the abnormality of the encoder. In addition, being free from influence from the weight of the attachment load held by the operation system, the configuration reduces erroneous detection of the abnormality of the encoder by the abnormality detection device and improves the accuracy in detecting the abnormality of the encoder.

The controller may include a control switch that detects a switch between drive control modes of the operation system, and switches processing routes for the commanded position information transmitted from the controller. A first delay control filter that compensates for the delay in the drive control of the motor and a damping filter may be connected in series between the controller and the second receiver. A second delay control filter that compensates for the delay in the drive control of the motor may be provided in parallel with the first delay control filter. The commanded position information may be transmitted to the first delay control filter and the damping filter connected in series or the second delay control filter in accordance with the switch between the processing routes by the control switch.

This configuration reduces the error between the commanded position information or the corrected position information and the detected position information according to the difference in the drive control modes of the operation system, and improves the accuracy in detecting the abnormality of the encoder.

The first delay control filter and the second delay control filter may have time constants different from each other.

Disclosed herein is a robot including at least: a robot mechanism including at least an output shaft and a motor that drives the output shaft; an encoder for sensing a rotational position of the motor; and the operation control device configured to control the drive of the motor and detects the abnormality of the encoder.

This configuration allows for detection of the abnormality of the encoder without adding, to the driver, any additional function for detecting the abnormality of the encoder. Being largely free from influence from the weight of the attachment load held by the robot, the configuration reduces erroneous detection of the abnormality of the encoder by the abnormality detection device and improves the accuracy in detecting the abnormality of the encoder.

Disclosed herein is a robot system including: a first robot; and one or more second robots configured to operate in cooperation with the first robot based on command information transmitted from a controller of the first robot; the first robot and the second robots, each being the robot; and the controller of the first robot configured to: compare a first frequency with a second frequency, the first frequency being a cutoff frequency determined by a weight of an attachment load held by the first robot, the second frequency being a cutoff frequency determined by a weight of an attachment load held by each of the second robots, apply a set of a damping filter and a delay control filter selected by the first robot to the first robot and the second robots, if the first frequency is equal to or lower than the second frequency, and apply a set of a damping filter and a delay control filter selected by the second robots to the first robot and the second robots, if the first frequency is higher than the second frequency.

In the system for cooperative control of the plurality of robots, the configuration is not largely influenced by the difference in the weights of the attachment loads held by the individual robots. In this state, this configuration reduces, with the robots in the system, erroneous detection of the abnormality of the encoder by the abnormality detection device and improves the accuracy in detecting the abnormality of the encoder. In addition, this configuration allows for detection of the abnormality of the encoder without adding, to each driver, any additional function for detecting the abnormality of the encoder.

As described above, the encoder's abnormality detection method and the operation control device according to the present disclosure allow determination on the abnormality of the encoder—even if a general-purpose encoder is used—under reduced influence on the existing functions or devices. In addition, without being largely influenced by the weight of the attachment load held by the operation system, the method and device reduce erroneous detection of the abnormality of the encoder by the abnormality detection device and improve the accuracy in detecting the abnormality of the encoder.

BRIEF DESCRIPTION OF THE DRAWINGS

FIG. 14 is a flowchart showing a procedure for setting a damping filter used for the robot system according to the fourth embodiment.

DETAILED DESCRIPTION

Embodiments of the present disclosure will be described below with reference to the drawings. The following description of advantageous embodiments is mere examples in nature, and is not at all intended to limit the scope, applications or use of the present invention.

First Embodiment

[Configuration of Robot and Control System of Robot]

Figure 1:
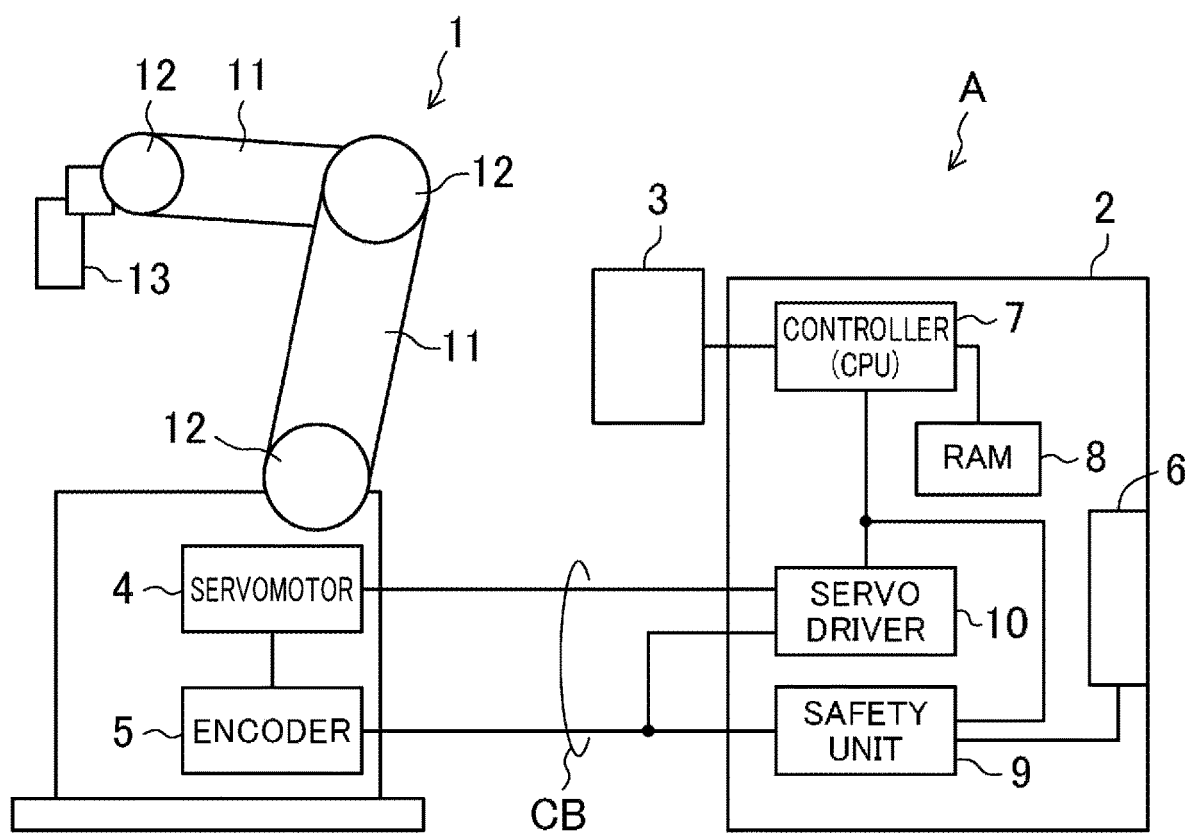
FIG. 1 is a schematic configuration diagram of a robot according to a first embodiment.
Figure 2:
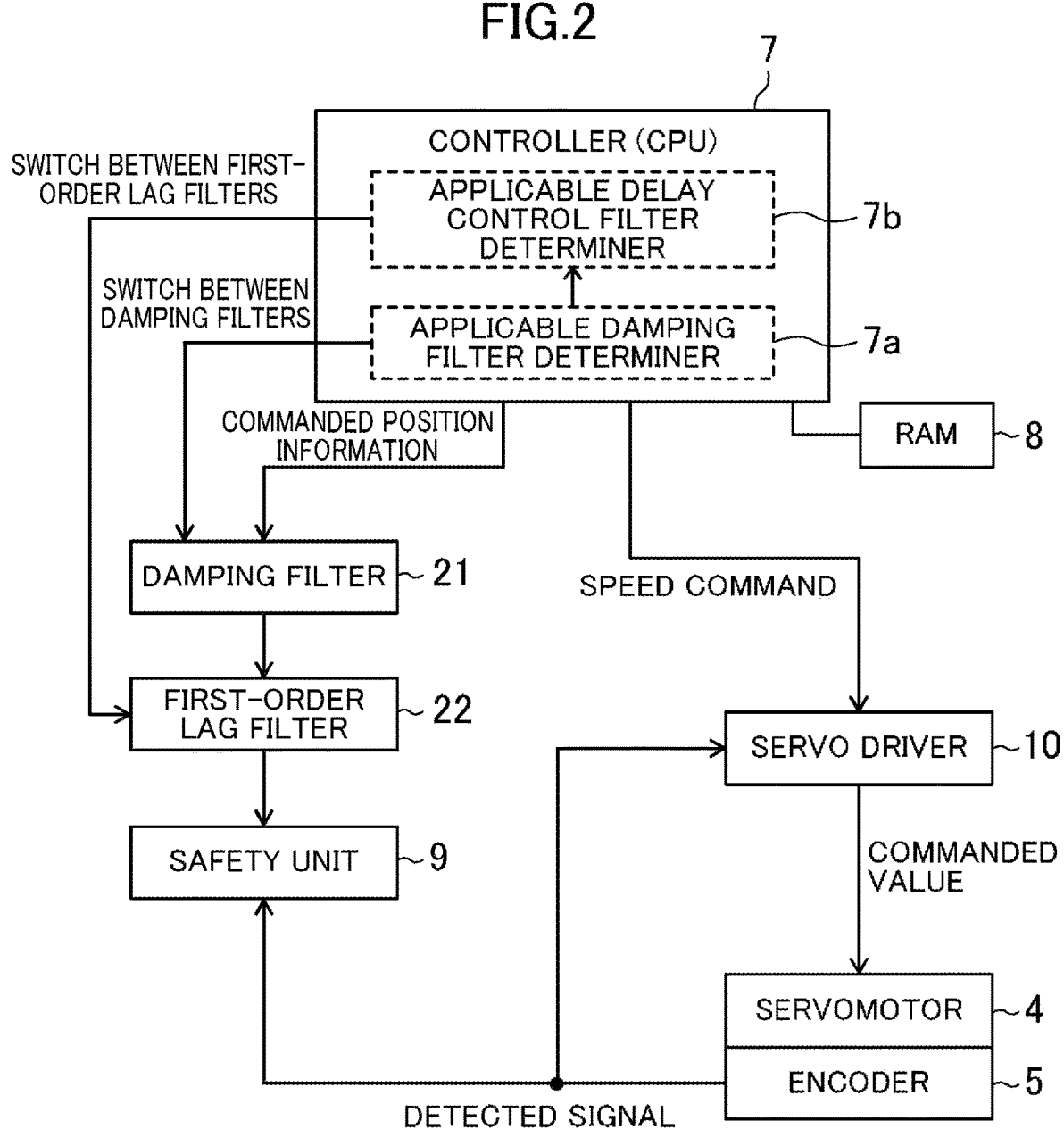
FIG. 2 is a block diagram showing a configuration of a robot controller according to the first embodiment.

FIG. 1 shows a schematic configuration of a robot as an operation system according to this embodiment. FIG. 2 is a block diagram showing a configuration of a robot controller 2. Arrows are used to clarify the direction in which information or signals is/are transmitted.

As shown in FIG. 1, a robot A includes a robot mechanism 1, a robot controller 2, and an operation unit 3 with a display. The robot mechanism 1 and the robot controller 2 are connected together by a connection cable CB. In FIG. 1, information is transmitted by wired connection through the connection cable CB. How to connect the elements are not limited to the wired connection and may be wireless connection. The same applies to the connection between the blocks.

The robot mechanism 1 has a plurality of robotic arms 11 and a plurality of joint axes 12. Attached to each robotic arm 11 is a motor 4 for operating the robotic arm 11. For example, being a 6-axis vertical articulated robot, the robot A includes six robotic arms 11 and six motors 4 corresponding to the robotic arms 11. Attached to each motor 4 is an encoder 5 for detecting the rotational position of the motor 4 or the amount of rotation based on the rotational position. In addition, each robotic arm 11 holds, at its distal end, a load 13 with a predetermined weight. Note that the load 13 includes, in addition to the load held by the robotic arm 11, an attachment mechanism and a component, such as a wire supply, attached to the robotic arm 11. In the following description, the load 13 may be referred to as an "attachment load 13" which is held by the robotic arm 11 of the robot A.

Although not shown in FIG. 1, attached to the robot A is an external shaft driven based on the drive control from the robot controller 2 to the robot mechanism 1. The external shaft is used in combination with the robot mechanism 1 in order to enlarge the movable range of the robot A. Attached to the external shaft is a motor 4 for operating the external shaft. Attached to the motor 4 is an encoder 5 for detecting the rotational position of the motor 4 or the amount of rotation according to the rotational position. That is, each motor 4 is provided for one of the joint axes 12 and the external shaft, and attached with one of the encoders 5. Note that the type of the external shaft is not particularly limited. For example, the technique according to this embodiment is applicable to any of a slider type and a positioner type, or any other type.

In this embodiment, for easier understanding of the invention, the motors 4 and encoders 5 used for the joint axes 12, and the motor 4 and encoder 5 used for the external shaft are shown (see FIG. 1) and described without distinguishing one from the other. Thus, the motors 4 or the encoders 5 referred to in the following description mean both of those used for the joint axes 12 and the external shaft. That is, the abnormality detection device and the abnormality detection method for detecting an abnormality of an encoder 5 described below is applicable both the encoders 5 attached to the motors 4 for the joint axes 12 and the encoder 5 attached to the motor 4 for the external shaft.

The encoder 5 is connected to a safety unit 9 and a servo driver 10, which will be described later, and outputs (feeds back) detected signals to the safety unit 9 and the servo driver 10.

The operation unit 3 includes an input (not shown) that receives an input operation by an operator of the robot A, and a display (not shown). The operation unit 3 communicates with the robot controller 2 in response to the input operation from the operator. This configuration allows the operator to set or control, for example, the operation of the robotic arms 11 via the operation unit 3. Note that the input may be a touch panel and that the display and the input may be configured integrally.

The robot controller 2 includes a controller (e.g., a CPU) 7, a random-access memory (RAM) 8, the safety unit 9 as an abnormality detection device, the servo driver 10 for driving the motors 4, and a safety circuit (i.e., a controller) 6. Upon receipt of an emergency stop signal for ordering an emergency stop from the safety unit 9, the safety circuit shuts off a power source (not shown) for driving the robot A. In the present disclosure, a robot control system includes the encoders 5 and the robot controller 2.

The RAM 8 stores training programs of the robot A created by the operator using the operation unit 3 or the function settings of the robot A, for example.

Based on the training programs of the robot A or the function settings of the robot A stored, for example, stored in the RAM 8, the controller 7 outputs a speed command (e.g., the moving distance per unit time) to the servo driver 10 and commands an operation of the robot A. Similarly, the controller 7 integrates the speed command from an original position and outputs the integrated value as commanded position information to the safety unit 9. The speed command is calculated based on the deceleration ratio of the robot A or the original position, for example.

Interposed between the controller 7 and the safety unit 9, namely, a DPRAM 95, which will be described later, is a damping filter 21 which removes a vibration component from the commanded position information input to the damping filter 21.

Actual control of the robot A may be performed with higher responsiveness (hereinafter referred to as a "highly responsive control"), depending on the details of the operation control of the servo driver 10. Examples includes control of a welding robot using a laser, at a high speed and an enhanced trajectory traceability. In such highly responsive control, a vibration component contained in the speed command may vibrate the motors 4 and eventually the robot mechanism 1 of the robot A. In order to reduce this vibration, the damping filter 21 is often used between the servo driver 10 and the motors 4. In the highly responsive control as described above, the configuration as shown in FIG. 2 may be employed to create the commanded position information similar to the control by the servo driver 10.

Also interposed between the controller 7 and the safety unit 9, namely, the DPRAM 95, which will be described later, is a first-order lag filter 22 as a delay control filter connected in series to the damping filter 21 and taking general control delays into consideration.

In the actual control of the robot A, as compared at the same time, the following two rotational positions of each motor 4 may be shifted. One is a rotational position of the motor 4 (commanded motor position) according to the commanded position information obtained by the safety unit 9 from the controller 7. The other is another rotational position of the motor 4 (detected motor position) according to the output signal, for example, obtained by the safety unit 9 from the associated encoder 5. This difference is caused by the characteristics of the motor control, for example. Specifically, after the controller 7 of the robot controller 2 has output the speed command and the commanded position information, the servo driver 10 actually controls the motor 4. Based on the control, the motor 4 then operates, which causes a delay for a certain time period. On the other hand, the first-order lag filter 22 shown in FIG. 2 largely reduces the difference between the commanded motor position and the detected motor position.

In this manner, the damping filter 21 and the first-order lag filter 22 are connected in series between the controller 7 and the safety unit 9. This configuration allows for highly accurate determination of an abnormality of the encoder 5. In the present disclosure, the controller 7, the safety unit 9, the servo driver 10, the damping filter 21, and the first-order lag filter 22 may be collectively referred to as an "operation control device".

Note that the damping filter 21 and the first-order lag filter 22 may be provided directly in any order. In FIG. 2, the positions of the damping filter 21 and the first-order lag filter 22 may be interchanged with each other, which provides the same or similar advantages.

The functions of the damping filter 21 and the first-order lag filter 22 are fulfilled using parameters such as a filter constant for removing a frequency band corresponding to the vibration component and a time constant corresponding to the time delay in the control. The functions may be implemented by hardware or software. For example, the respective parameters of the damping filter 21 and the first-order lag filter 22 are stored in the RAM 8. As will be described later, the RAM 8 stores sets of a filter constant and a time constant corresponding to the filter constant. One of the sets is selected by an applicable damping filter determiner 7a and an applicable delay filter determiner 7b in the controller 7 and applied as the damping filter 21 and the first-order lag filter 22. These will be described later in detail (see FIGS. 5 and 6).

The servo driver 10 controls each motor 4 based on the speed command received from the controller 7 and the output signal from the associated encoder 5 to control the operation of the robot A.

The safety unit 9 is directly connected to each encoder 5 and the controller 7. Based on the detected position information on the motor 4 calculated based on the output signal received from the encoder 5 and the commanded position information received from the controller 7, the safety unit 9 determines whether or not the encoder 5 has a malfunction.

Figure 3:
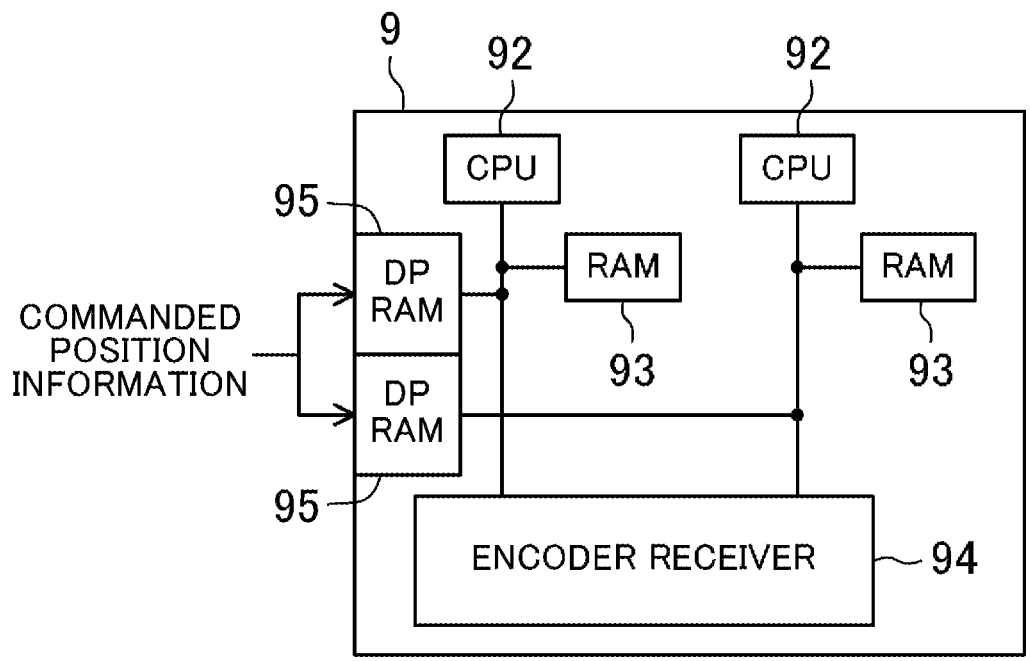
FIG. 3 is a block diagram showing a configuration of a safety unit.

FIG. 3 is a block diagram showing a configuration of the safety unit 9. The safety unit 9 includes a CPU 92 as a determiner, a RAM 93, an encoder receiver 94 as a first receiver, and a dual-port RAM (DPRAM) 95 as a second receiver.

The encoder receiver 94 is connected to each encoder 5 and obtains the output signal from the encoder 5.

The DPRAM 95 is connected to the controller 7 of the robot controller 2, and obtains the commanded position information output from the controller 7 or corrected position information which will be described later. This commanded position information is obtained by integrating the speed command output from the controller 7 to the servo driver 10. The commanded position information or corrected position information obtained by the DPRAM 95 is stored in the RAM 93.

The CPU 92 receives the output signal from the encoder receiver 94 and calculates the detected position information regarding the current position of the motor 4 using the output signal and the deceleration ratio of the robot A or the original position, for example. The CPU 92 compares the commanded position according to the commanded position information or the corrected position information to the detected position according to the detected position information to check whether or not there is an abnormality of the encoder 5.

In FIG. 3, two sets of the CPU 92, the RAM 93, and the DPRAM 95 are connected with the same configuration and have the same functions. This configuration allows for parallel processing using the two CPUs 92. That is, double abnormality determination is possible, which improves the reliability as compared to the case including only a single set.

[Abnormality Detection Method for Detecting Abnormality of Encoder]

Figure 4:
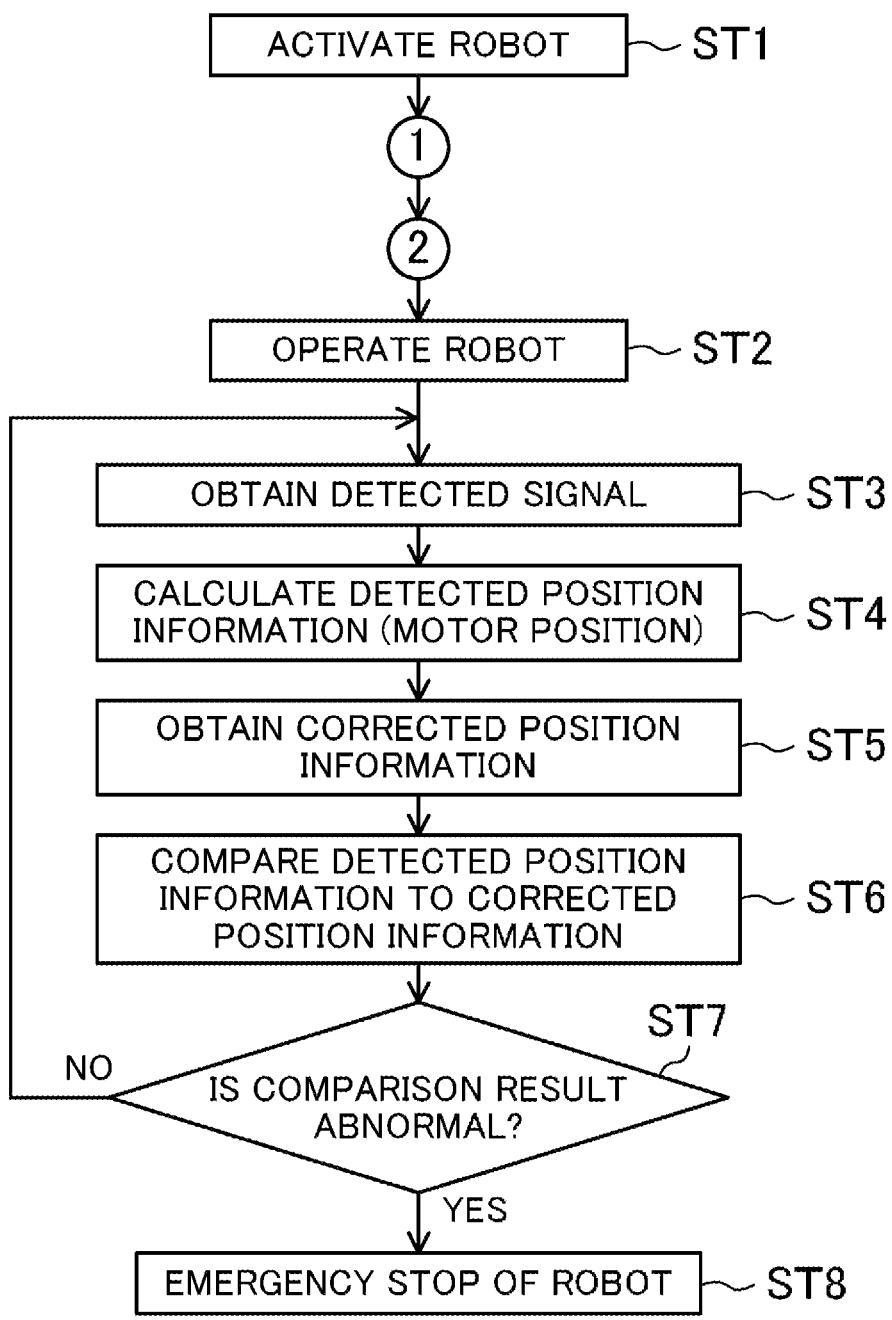
FIG. 4 is a flowchart showing an abnormality determination method for determining an abnormality of an encoder according to the first embodiment.
Figure 5:
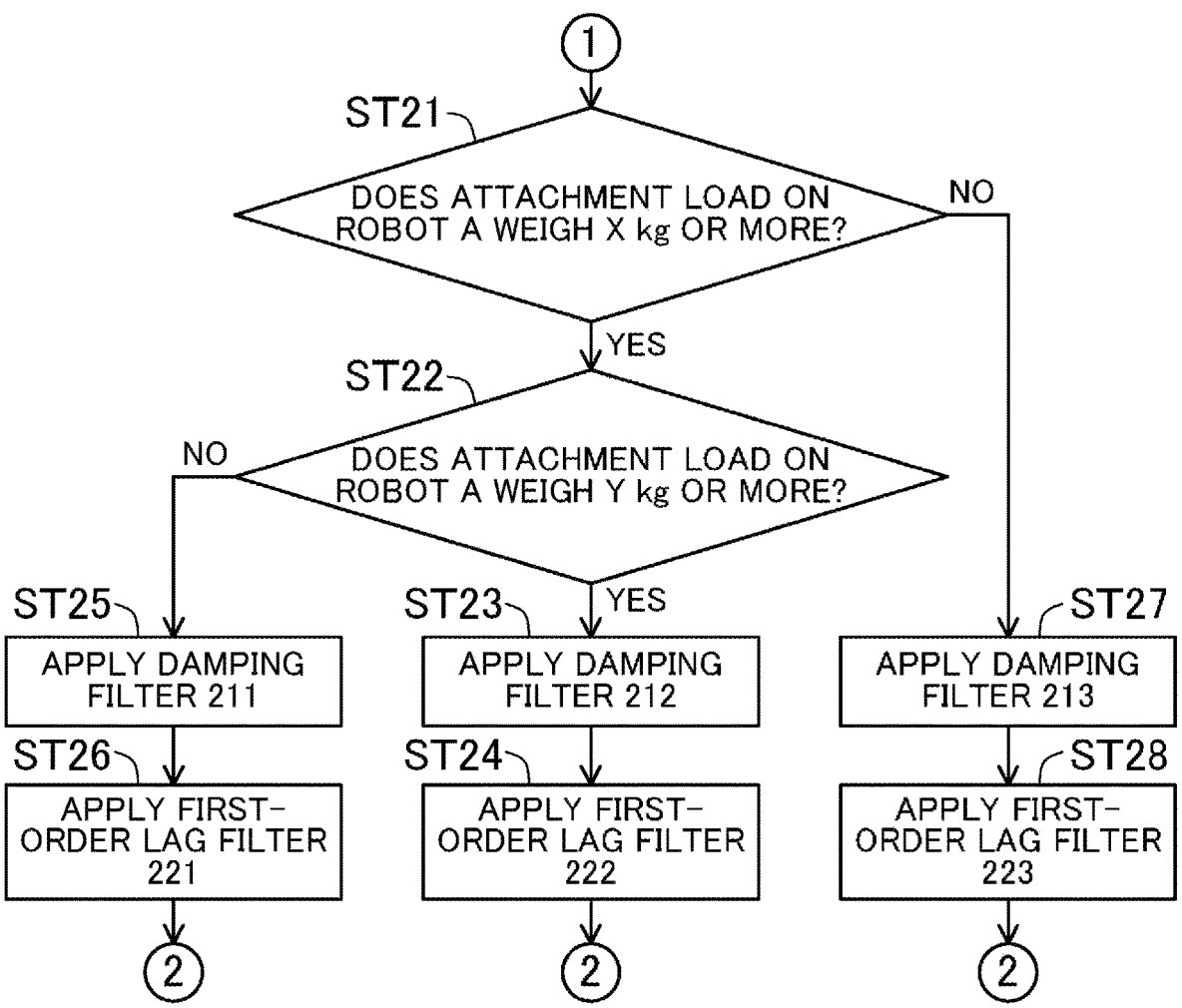
FIG. 5 is a flowchart showing a procedure for switching damping filters and first-order lag filters.
Figure 6:
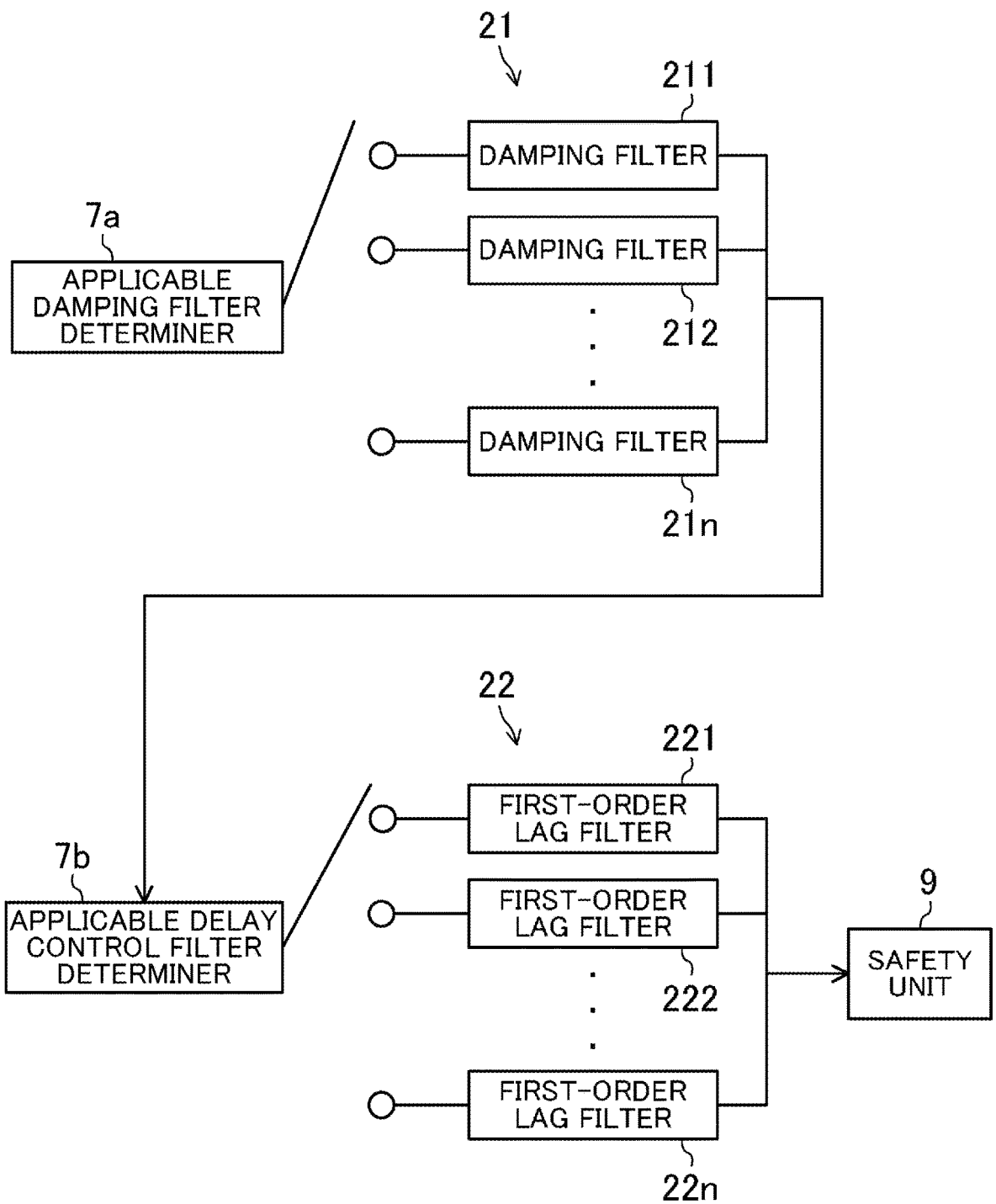
FIG. 6 is a block diagram related to the switch among the damping filters and the first-order lag filters.

FIG. 4 is a flowchart showing how the safety unit 9 monitors an abnormality of the encoder 5 after the robot A has been activated by the robot controller 2 and started operating. That is, FIG. 4 shows how the safety unit 9 detects an abnormality of the encoder 5, when the controller 7 rotates the motor 4 through the servo driver 10. FIG. 5 shows the procedure for switching damping filters and the first-order lag filters, and corresponds to a subroutine of the abnormality detection method shown in FIG. 4. FIG. 6 is a block diagram showing switches among the damping filters and among the first-order lag filters.

Now, the abnormality detection method for detecting an abnormality of each encoder 5 will be described with reference to FIGS. 4 to 6.

In step ST1 of FIG. 4, the controller 7 of the robot controller 2 activates the robot A. The process proceeds to the subroutine shown in FIG. 5. FIG. 5 shows an example of preparing damping filters 211 to 213 with filter constants different from each other, and first-order lag filters 221 to 223 with time constants from each other.

As shown in FIG. 5, the applicable damping filter determiner 7a of the controller 7 determines whether or not the attachment load 13 held by the robot A weighs X kg or more (step ST21). In the operation program of the robot A, the weight value of the attachment load 13 is set in advance, which is compared to the predetermined threshold X for the determination. If the result of the determination in step ST21 is positive, the processing proceeds to step ST22 to determine whether or not the attachment load 13 held by the robot A weighs Y kg or more. The applicable damping filter determiner 7a compares the weight value set in advance of the attachment load 13 to the predetermined threshold Y for the determination. Note that the thresholds X and Y are different from each other.

As shown in FIG. 6, the applicable damping filter determiner 7a selects a corresponding one of the filter constants stored in the RAM 8 based on the result of the determinations in steps ST21 and ST22, and applies the selected filter constant to the damping filter 21. In other words, the applicable damping filter determiner 7a selects a corresponding one of the damping filters 211 to 21n, where n is an integer of 2 or more, with filter constants different from each other. In this manner, the damping filters 21 to be applied to the control of the robot A are switched, which changes the frequency band of the vibration component to be removed from the commanded position information.

If the result of the determination in step ST22 is positive, the applicable damping filter determiner 7a switches the damping filter to be applied to the control of the robot A to the damping filter 212 (step ST23). On the other hand, if the result of the determination in step ST22 is negative, the damping filter determiner 7a switches the damping filter to be applied to the control of the robot A to the damping filter 211 (step ST25). If the result of the determination in step ST21 is negative, the damping filter applied to the control of the robot A is switched to the damping filter 213 (step ST27).

As described above, the time constants corresponding to the filter constants of the damping filter 21 are associated with each other and stored in the RAM 8. In other words, as shown in FIG. 6, the first-order lag filters 221 to 22n are prepared corresponding to the damping filters 211 to 21n. The applicable delay filter determiner 7b selects one of the first-order lag filters 221 to 223 corresponding to the damping filters 211 to 213 selected in steps ST23, ST25, and ST27, respectively (steps ST24, ST26, and ST28).

Upon selection of any of the first-order lag filters 221 to 223, the subroutine shown in FIG. 5 ends and the process proceeds to step ST2 shown in FIG. 4.

In step ST2, the robot controller 2 operates the robot A based on the training programs or the function settings, for example, set by the operator through the operation unit 3. Specifically, the controller 7 outputs the speed command to the servo driver 10 and the commanded position information to the safety unit 9 based on the training programs and the function settings, for example, stored in the RAM 8. Note that, with respect to the speed command to be transmitted from the controller 7 to the servo driver 10, the vibration component that has changed in accordance with the weight of the attachment load 13 is removed properly.

On the other hand, with respect to the commanded position information to be output to the safety unit 9, the vibration component is removed by a damping filter 21j, where j is an integer satisfying $1 \leq j \leq n$, and the control delay (i.e., the time delay) is compensated by a first-order lag filter 22j. The damping filters and the first-order lag filters are switched in the procedure shown in FIG. 5 in accordance with the weight of the attachment load 13 held by the robot A. In the following description, the commanded position information may be referred to as "corrected position information".

Based on the speed command received from the controller 7, the servo driver 10 drives the motors 4 to operate the joint axes 12 and the external shaft of the robot A. The servo driver 10 receives output signals from the encoders 5 attached to the motors 4, and performs feedback control of the motors 4 based on differences between the speed command and the output signals. At this time, the output signals from the encoders 5 are also output to the safety unit 9.

Upon obtaining of the output signal from each encoder 5 (ST3), the safety unit 9 calculates the position of the corresponding motor (ST4). Specifically, the CPU 92 of the safety unit 9 performs the position calculation of converting the output signal obtained from the encoder 5 into the rotational position (i.e., current position) of the motor 4 based on the deceleration ratio of each shaft of the motor 4 and the original position information on the motor 4, for example. The output signal obtained from the encoder 5 is transmitted, for example, in the form of a pulse signal.

In addition, the safety unit 9 receives the corrected position information from the controller 7 via the damping filter 21 and the first-order lag filter 22 (ST5). The safety unit 9 compares the detected position information related to the current position of the motor 4 calculated in ST4 to the corrected position information from the controller 7 (ST6). Specifically, the CPU 92 of the safety unit 9 compares the rotational position (i.e., the detected motor value) of the motor 4 calculated based on the output signal from the encoder 5 to the rotational position (i.e., the commanded motor value) of the motor commanded by the controller 7. However, the commanded motor value has passed through the damping filter 21 and the first-order lag filter 22.

If the difference between the commanded motor value and the detected motor value is greater than or equal to a predetermined value (YES in ST7) as a result of the comparison, the CPU 92 determines that the encoder 5 has an abnormality. The process proceeds to step ST8. On the other hand, if the difference between the commanded motor value and the detected motor value is smaller than the predetermined value (NO in ST7), the CPU determines that the encoder 5 has no abnormality. The flow returns then to step ST3.

Specifically, in the drive control of the robot A, each motor 4 attempts to move to the position commanded by the controller 7. Thus, the difference between the detected motor value (i.e., the detected position information) indicating the rotation position of the motor 4 and the commanded motor value (i.e., the corrected position information) indicating the rotational position commanded by the controller 7 should fall within a predetermined threshold. Accordingly, if the rotational position of the motor according to the detected motor value is determined to be away from the commanded motor position according to the commanded motor value by a predetermined amount or more, the encoder is determined to have a malfunction.

In step ST8, the CPU 92 of the safety unit 9 transmits an emergency stop signal to the safety circuit 6. The safety circuit 6 that has received the emergency stop signal shuts off the driving power supply of the robot A for an emergency stop of the robot A.

In this manner, after the controller 7 has activated the robot A and caused the robot A to start the operation, the safety unit 9 repeatedly executes the processes of steps ST3 to ST7 and determines abnormalities of the encoders 5.

[Advantages, Etc.]

As described above, according to this embodiment, in the detection of an abnormality of each encoder 5, the safety unit 9 detects the abnormality of the encoder 5 based on the result of the comparison between the corrected position information obtained from the controller 7 via the damping filter 21 and the first-order lag filter 22 and the position information calculated based on the output signal from the encoder 5. Accordingly, the safety unit 9 adds, to the operation system, such as a general-purpose robot, including no abnormality detection device for detecting an abnormality of an encoder, and detects the abnormality of the encoder due to a malfunction. At this time, there is no need to change the design, for example, of the existing components, such as the servo driver 10, of the general-purpose robot, which reduces influences on the existing system. There is thus no need to indicate that the processing is properly performed for the determination on the abnormality of the encoder in the existing system, which leads to non-complicated processing.

The damping filter 21 and the first-order lag filter 22 between the controller 7 and the safety unit 9 allow highly accurate determination on an abnormality of each encoder 5. In addition, a desired set of filters is selected from the damping filters 211 to 21n and the first-order lag filters 221 to 22n in accordance with the weight of the attachment load 13 and applied to the commanded position information to be transmitted from the controller 7 to the safety unit 9. This configuration further improves the accuracy in detecting the abnormality of the encoder 5. This will be described below.

As described above, in order to reduce the vibrations during the operation of the robot A, the vibration component corresponding to the natural frequency of the robot A is removed from the speed command to be transmitted to the servo driver 10. The same applies to variations in the weight of the attachment load 13, for example, the weight of an attachment mechanism, such as a feeder, attached to each robotic arm 11 or a load held by the robotic arm 11, and variations in the natural frequency of the robot A.

However, the commanded position information to be transmitted to the safety unit 9 usually passes through only the damping filter 21 which has the parameters set in advance. At a variation in the weight of the attachment load 13, the vibration component may not be removed from the commanded position information properly and the safety unit 9 may erroneously detects an abnormality of each encoder.

On the other hand, according to this embodiment, in accordance with the weight of the attachment load 13 held by the robot A, the set of the damping filter 21 and the first-order lag filter 22 is selected which have the matching parameters such as the filter constant for removing the vibration component and the time constant of the control delay. The selected filters are applied to the commanded position information to be transmitted from the controller 7 to the safety unit 9. This configuration reduces erroneous detection in each encoder 5 and detects an abnormality of the encoder 5 at a high accuracy.

In FIG. 5, a procedure for selecting one of three sets of the damping filters 211 to 213 and the first-order lag filters 221 to 223 in accordance with the weight of the attachment load 13 to control the robot A and apply the filters to the commanded position information has been described. However, the number of the selected set(s) of filters is not particularly limited thereto. The number may vary as appropriate in accordance with the attachment mechanism attached to the robot A or the loads held by the robotic arms 11, for example. The variation widths of the individual parameters of the damping filters 211 to 21*n* and the first-order lag filters 221 to 22*n* may vary as appropriate.

As described above, the first embodiment has been described as an example technique disclosed in the present application. The technique according to the present disclosure is not limited thereto and also applicable to embodiments obtained by making changes, substitutions, additions, and omissions, for example, to the embodiment as appropriate. For example, the first embodiment may include the following configuration.

<First Variation>

Figure 7:
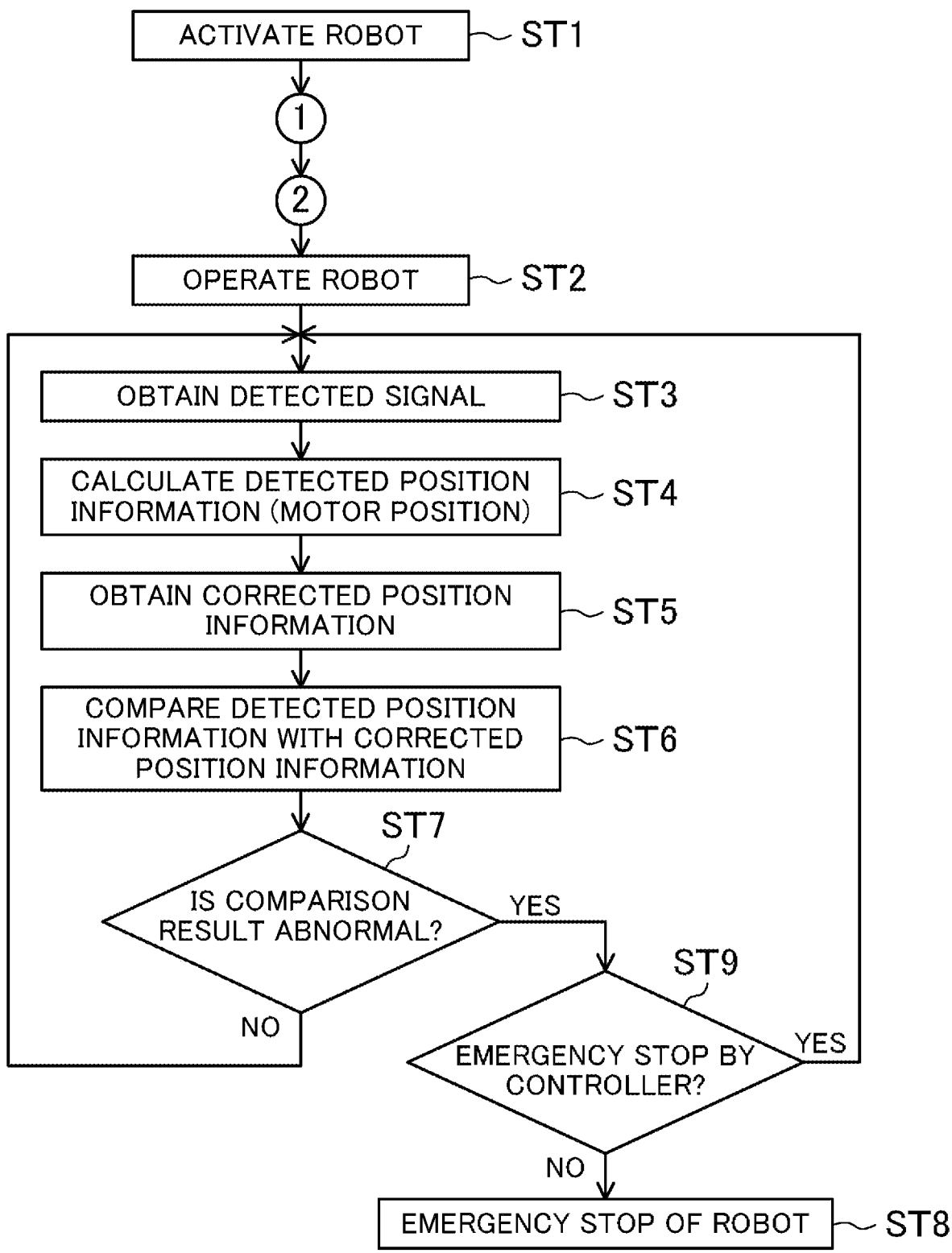
FIG. 7 is a flowchart showing an abnormality determination method for determining an abnormality of an encoder according to a first variation.

The abnormality determination method shown in FIG. 4 may be replaced with the flow shown in FIG. 7. In FIG. 7, the processes in steps ST1 to ST6 are the same as those in FIG. 4. Detailed description thereof will thus be omitted here. Between steps ST1 and ST2, the following are performed as shown in FIG. 5. The corresponding set of filters is selected from the damping filters 211 to 21*n* and the first-order lag filters 221 to 22*n* in accordance with the weight of the attachment load 13. The filters are switched to control the robot A and to be applied to the commanded position information. In this respect, this variation is similar to the first embodiment.

In FIG. 7, in step ST7, if the difference between the commanded motor value and the detected motor value is greater than or equal to the predetermined value, that is, if the result of the determination in step ST7 is positive, the process proceeds to step ST9. In step ST9, the CPU 92 of the safety unit 9 determines whether the controller 7 has given an instruction on an emergency stop of the robot A.

Specifically, for the emergency stop of the robot A, the controller 7 outputs an emergency stop signal (not shown) to the safety circuit 6. The safety circuit 6 that has received the emergency stop signal shuts off the driving power supply for the robot A to stop the robot A. In this variation, the safety unit 9 obtains the emergency stop signal from the controller 7. In step ST9, it is determined whether or not an emergency stop signal is output from the controller 7. If the result of the determination in step ST9 is positive, that is, if an emergency stop signal is output from the controller 7, the flow returns to step ST3. That is, even if the difference between the commanded motor value and the detected motor value is greater than or equal to the predetermined value, no abnormality of the encoders 5 is determined.

On the other hand, if the result of the determination in step ST9 is negative, that is, if no emergency stop signal is output from the controller 7, the process proceeds to step ST8. In step ST8, the CPU 92 of the safety unit 9 transmits an emergency stop signal to the safety circuit 6. The safety circuit 6 that has received the emergency stop signal executes an emergency stop of the robot A.

In this manner, the processing in step ST9 follows step ST7. This hinders erroneous determination by the safety unit 9 on an abnormality of each encoder 5 at the occurrence of an emergency stop under the instruction from the controller 7. Specifically, once the controller 7 outputs the emergency stop signal to stop the robot A, the controller 7 stops outputting the commanded position information. In continuous comparison between the commanded motor value and the detected motor value, the safety unit 9 may erroneously determine an abnormality of the encoder 5 operating normally. However, the processing according to this aspect reduces such the problem.

In the flows in FIGS. 4 and 7, the steps are not necessarily be performed in the order described above. If the order is changeable or parallel processing is possible, the order of the processing and the processing method may be changed as appropriate. For example, the processes according to steps ST3 and ST4 and the process according to step ST5 may be performed in parallel.

Second Embodiment

This embodiment differs from the configuration of the first embodiment in that the processing routes of the commanded position information are switched taking a switch between highly responsive control and normal control into consideration.

For example, a dynamic control switch may be performed between the highly responsive control and the normal control of a robot. The highly responsive control is performed in a laser welding section which requires a highly accurate operation such as laser welding with a laser projection system attached to the distal end of each arm of the robot A. The normal control is performed in the other sections placing priority on the speed to reduce the takt time. Using the damping filter 21 and the first-order lag filter 22 to reduce the error generated in the comparison between the commanded position information and the detected position information has already been described. However, if these filters are used as they are at the control switch described above, there may be a larger difference between the actual motion of the robot A and the commanded position information given to the safety unit 9. This may hinder an improvement in the accuracy in detecting an abnormality of each encoder 5.

To address the problems, this embodiment discloses a configuration and a method of accurately detecting an abnormality of each encoder 5 by the following method, even after switching the control modes of the robot A. In accordance with the control method actually performed by the controller 7, the routes for processing the commanded position information to be transmitted to the safety unit 9 are switched.

Figure 8:
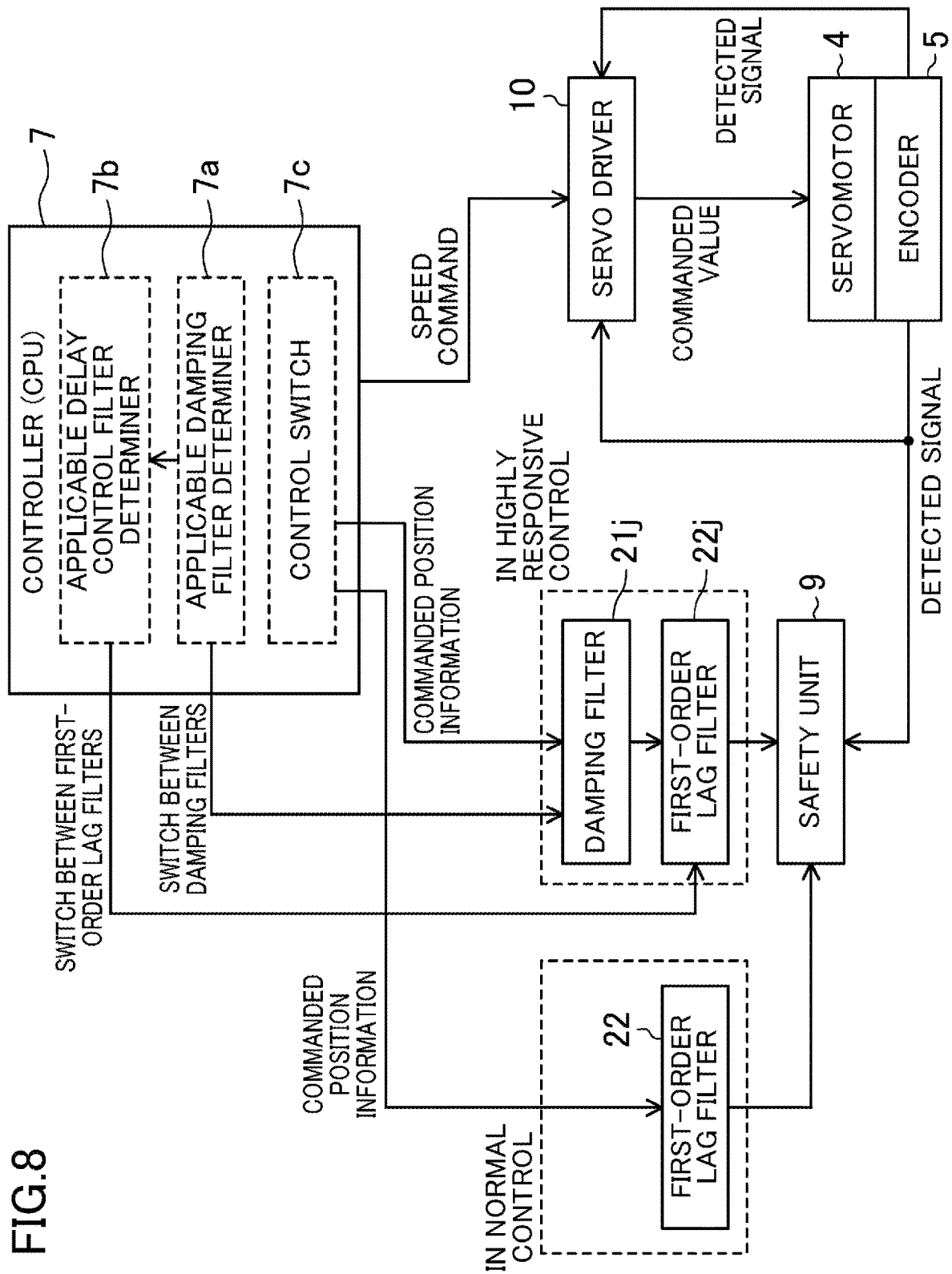
FIG. 8 is a block diagram showing a configuration of a robot controller according to a second embodiment.

FIG. 8 shows a configuration of a robot controller according to this embodiment. This configuration differs from the configuration shown in FIG. 2, for example, in that the controller 7 includes a control switch 7c for switching the drive controls of the robot A. Once the drive control modes of the robot A are switched in accordance with the training programs or an input from the operation unit 3, the control switch 7c detects the switch and switches the routes for transmitting the commanded position information. As shown in FIG. 8, in the normal control, the first-order lag filter 22 is applied. The commanded position information is then transmitted to the safety unit 9. In the highly responsive control, the damping filter 21j and the first-order lag filter 22j are applied. The corrected position information is then transmitted to the safety unit 9.

The function of the control switch 7c may be implemented on hardware of the controller 7 or software.

Figure 9:
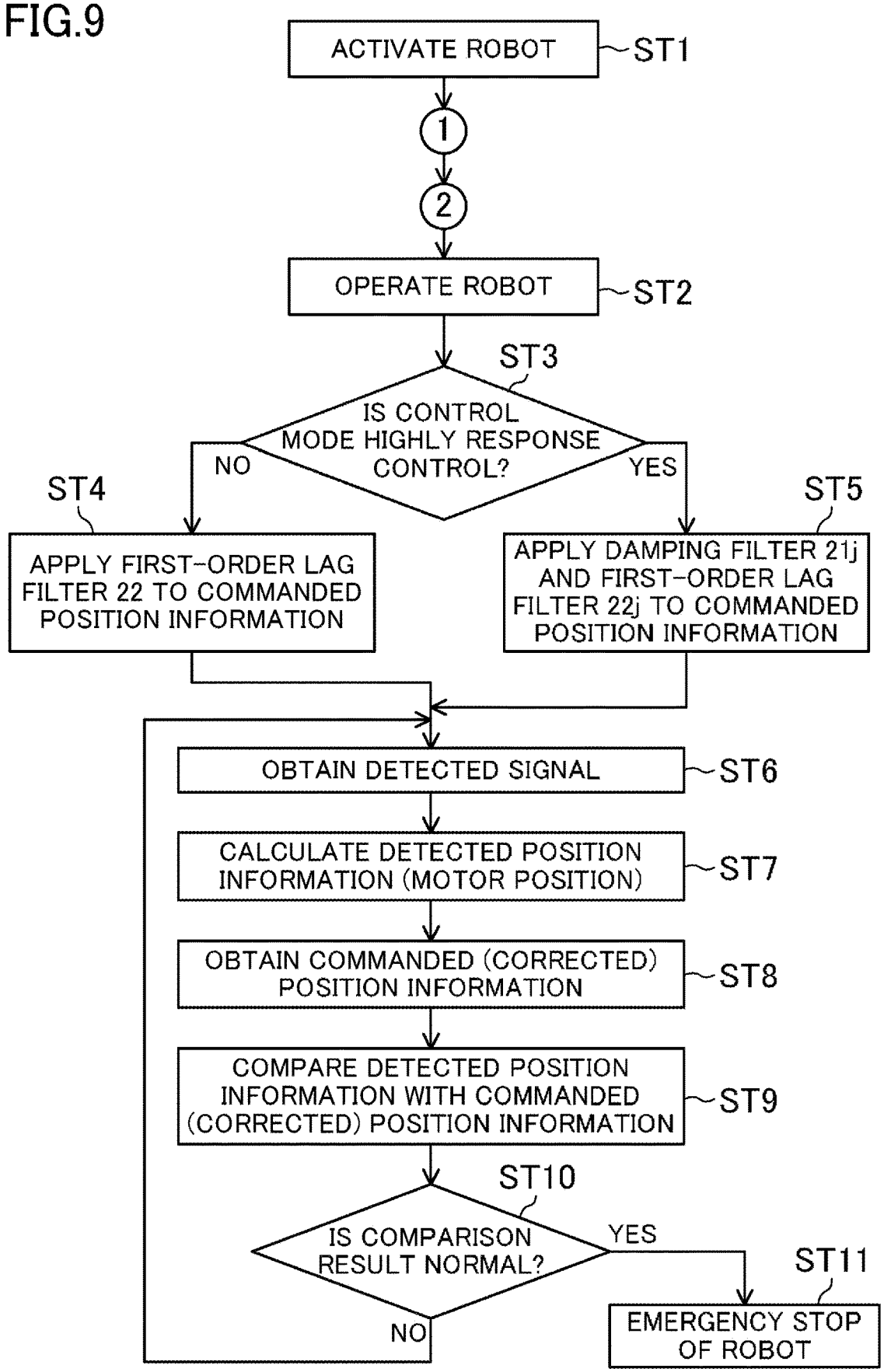
FIG. 9 is a flowchart showing an abnormality determination method for determining an abnormality of an encoder according to the second embodiment.

FIG. 9 is a flowchart showing an abnormality determination method for determining an abnormality of each encoder 5 according to this embodiment.

That is, FIG. 9 shows how the safety unit 9 monitors an abnormality of each encoder 5 when the controller 7 rotates the associated motor 4 through the servo driver 10.

In FIG. 9, the processes in steps ST1, ST2, and ST6 to ST11 are the same as steps ST1 to ST8 in FIG. 4. Detailed description thereof will thus be omitted here. Between steps ST1 and ST2, the following are performed as shown in FIG. 5. The corresponding set of filters is selected from the damping filters 211 to 21n and the first-order lag filters 221 to 22n in accordance with the weight of the attachment load 13. The filters are applied to the commanded position information to be transmitted from the controller 7 to the safety unit 9. In this respect, this embodiment is similar to the first embodiment.

In step ST3, whether the drive control mode of the robot A is the highly responsive control or not is determined. This determination is made by the control switch 7c of the controller 7 as described above.

If the result of the determination in step ST3 is positive, that is, if the drive control mode of the robot A is the highly responsive control, in step ST4, the damping filter 21j and the first-order lag filter 22j are applied. The corrected position information is then transmitted to the safety unit 9.

If the result of the determination in step ST3 is negative, that is, if the drive control mode of the robot A is the normal control, the first-order lag filter 22 is applied in step ST5. The commanded position information is then transmitted to the safety unit 9.

As described above, according to this embodiment, the transmission routes of the commanded position information to be transmitted from the controller 7 to the safety unit 9 are switched in accordance with the drive control mode of the robot A. This configuration improves the accuracy in detecting an abnormality of each encoder 5.

For example, the drive control mode of the robot A is the highly responsive control. The damping filter 21j for removing the vibration component contained in the commanded position information and the first-order lag filter 22j for reducing the response delay in the control are applied to the commanded position information. This improves the accuracy in detecting an abnormality of each encoder 5. In addition, a desired set of filters is selected in accordance with the weight of the attachment load 13 and applied to the commanded position information to be transmitted from the controller 7 to the safety unit 9. This configuration further improves the accuracy in detecting an abnormality of each encoder 5.

On the other hand, if the drive control mode of the robot A is the normal control, there is often no need to take the removal of the vibration component contained in the commanded position information into consideration. Thus, no damping filter 21 but the first-order lag filter 22 is applied to the commanded position information. This reduces an unexpected error and improves the accuracy in detecting an abnormality of each encoder 5.

The weight of the attachment load 13 mainly influences the frequency band of the vibration component of the robot A. Thus, one of the damping filter 21 with different filter constants is selected in accordance with the weight of the attachment load 13. This allows proper removal of the vibration component from the commanded position information using the damping filter 21, even in a variation in the frequency band of the vibration component.

On the other hand, the first-order lag filters 22 and 22j may have time constants different from each other. A delay in driving the motor 4 is not significantly influenced by the weight of the attachment load 13. Therefore, the initial setting value is applied as the time constant of the first-order lag filter 22 to be applied in the normal control, regardless of the weight of the attachment load 13. This simplifies and stabilizes the robot control device.

Third Embodiment

Figure 10:
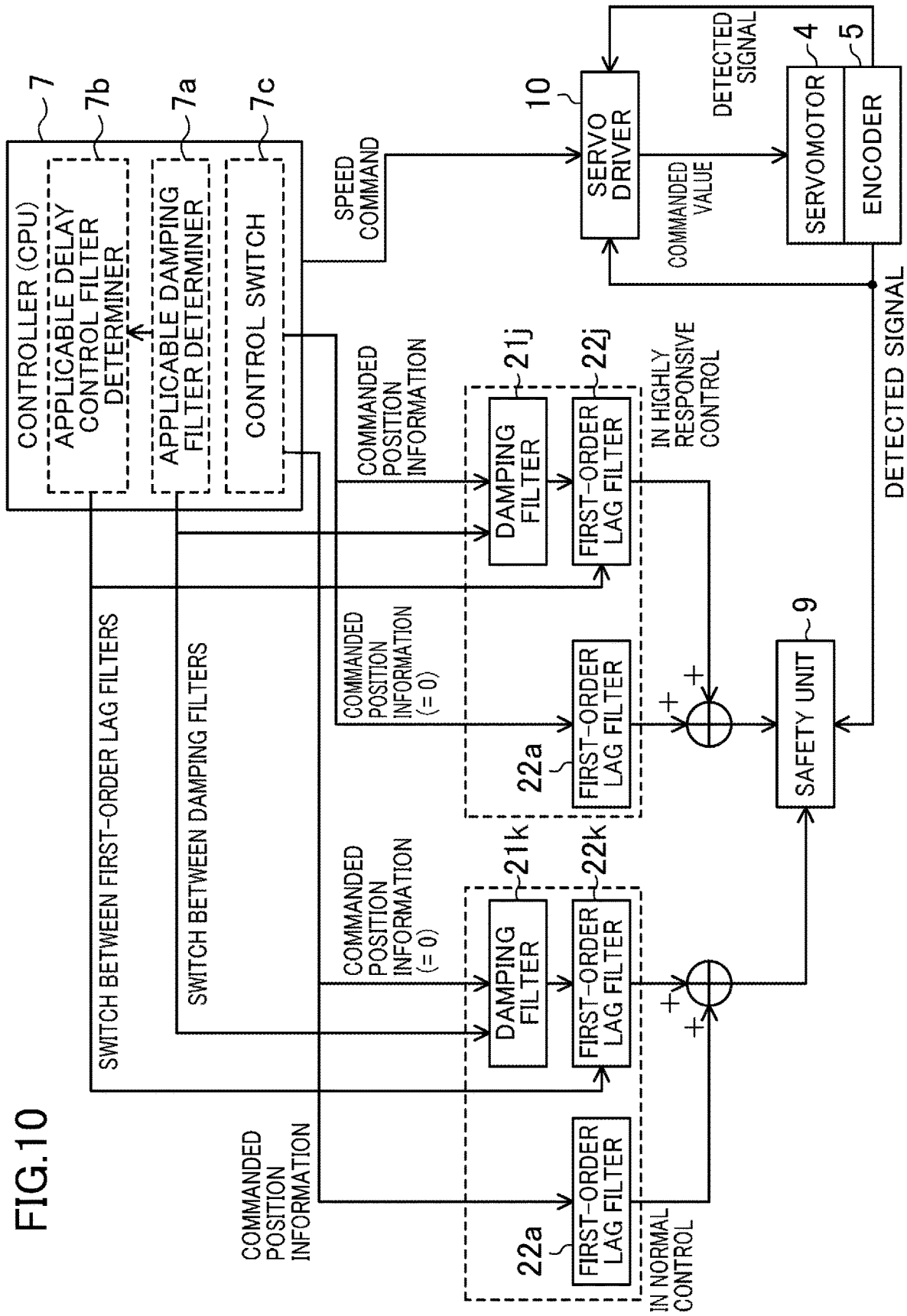
FIG. 10 is a block diagram showing a configuration of a robot controller according to a third embodiment.
Figure 11:
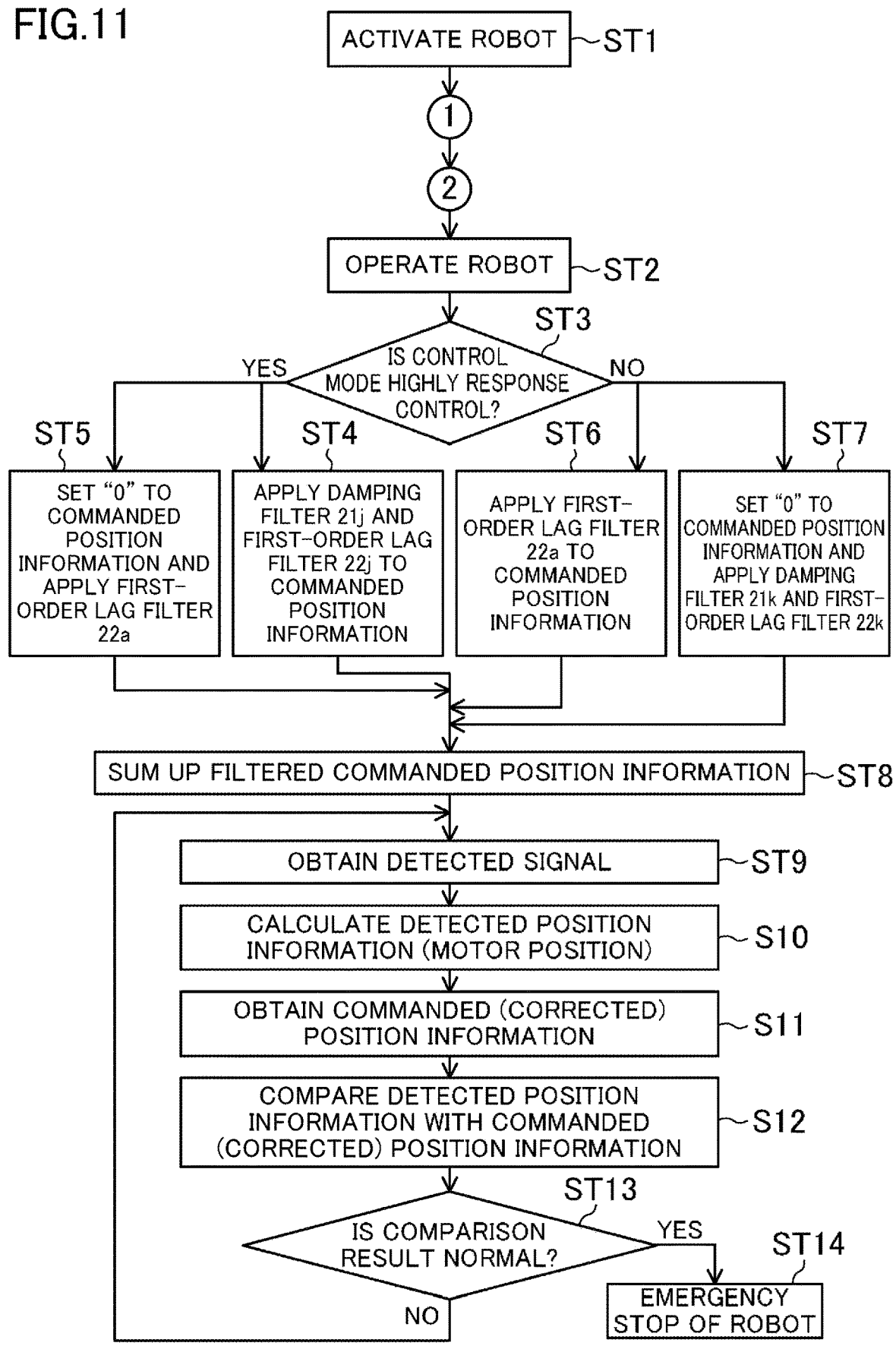
FIG. 11 is a flowchart showing an abnormality determination method for determining an abnormality of an encoder according to the third embodiment.

FIG. 10 is a block diagram showing a configuration of a robot controller according to this embodiment. FIG. 11 is a flowchart showing an abnormality detection method for detecting an abnormality of each encoder according to this embodiment.

In the configuration shown in FIG. 10, the information including the commanded position information to be transmitted from the controller 7 is processed in parallel by a dual system of routes so as to be transmitted to the safety unit 9. Through one of the routes, the information is processed by a filter(s) corresponding to the drive control mode of the robot A. Through the other route, the information is processed by a filter(s) not corresponding to the drive control mode. In this respect, the configuration differs from that shown in FIG. 8. In the configuration shown in FIG. 10, "0" is input as the commanded position information to the filter not corresponding to the drive control mode of the robot A.

In the actual drive control of the robot A, the influence of the processing of applying the damping filter 21 and the first-order lag filter 22 to the commanded position information continues until the elapse of a certain time. At a rapid switch between the drive control modes of the robot A, there may be an error in the commanded position information to be determined by the safety unit under the influence of the commanded position information filtered insufficiently.

To address the problem, this embodiment prepares the dual-system filter for the filter processing on the commanded position information from the controller 7 as shown in FIG. 10. Together with the parallel processing on these commanded position information, different information is processed by the systems in accordance with the drive control mode of the robot A. The result of summing up the processing is set as new commanded position information.

Now, the flowchart shown in FIG. 11 will be described. In the flow shown in FIG. 11, the processes in steps ST1, ST2, and ST9 to ST14 are the same as steps ST1 to ST8 in FIG. 4. Detailed description thereof will thus be omitted here. In addition, between steps ST1 and ST2, as shown in FIG. 5, the corresponding set of filters is selected from the damping filters 211 to 21n and the first-order lag filters 221 to 22n in accordance with the weight of the attachment load 13 to control the robot A and apply the filters to the commanded position information as in the first embodiment.

In step ST3, the drive control mode of the robot A is determined. If the highly responsive control is determined, the damping filter 21j and the first-order lag filter 22j are applied to the commanded position information from the controller 7 to obtain the corrected position information (step ST4).

In parallel with the processing in ST4, in step ST5, the commanded position information from the controller 7 is set to "0" and then the first-order lag filter 22a is applied to processing. In step ST8, the results of the processing are summed up and used as the corrected position information to be transmitted to the safety unit 9.

On the other hand, in step ST3, assume that the drive control mode of the robot A is determined to be the normal control. The commanded position information from the controller 7 is applied to the first-order lag filter 22a for filter processing (step ST6). In parallel, the commanded position information from the controller 7 is set to "0" and a damping filter 21k and a first-order lag filter 22k, where k is an integer satisfying 1≤k≤n, are applied to filter processing (step ST7). In step ST8, the processing results are summed up and used as the commanded position information to be transmitted to the safety unit 9.

As described above, this embodiment always performs the parallel processing on the information transmitted from the controller 7 through the filter(s) corresponding to the drive control mode of the robot A and through the filter(s) not corresponding to this drive control mode.

Directly applied to the filter(s) corresponding to the drive control mode of the robot A is the commanded position information transmitted from the controller 7. On the other hand, the commanded position information "0" is set to the filter(s) not corresponding to the drive control mode, for filter processing. The results of the filter processing by both the systems are summed up and transmitted as the new corrected position information to the safety unit 9.

Such the processing absorbs a difference in the response delay caused by the difference in the control mode and reduces the difference between the commanded motor position and the detected motor position, even in different drive control modes of the robot A. As a result, it is possible to improve the accuracy in detecting an abnormality of each encoder. In addition, a desired set of the damping filter 21 and the first-order lag filter 22 is selected in accordance with the weight of the attachment load 13 and applied to the control of the robot A. This further improves the accuracy in detecting an abnormality of each encoder 5.

As described above, the third embodiment has been described as an example technique disclosed in the present application. The technique according to the present disclosure is not limited thereto and also applicable to embodiments obtained by making changes, substitutions, additions, and omissions, for example, to the embodiment as appropriate. For example, the third embodiment may include the following configuration.

<Second Variation>

Figure 12:
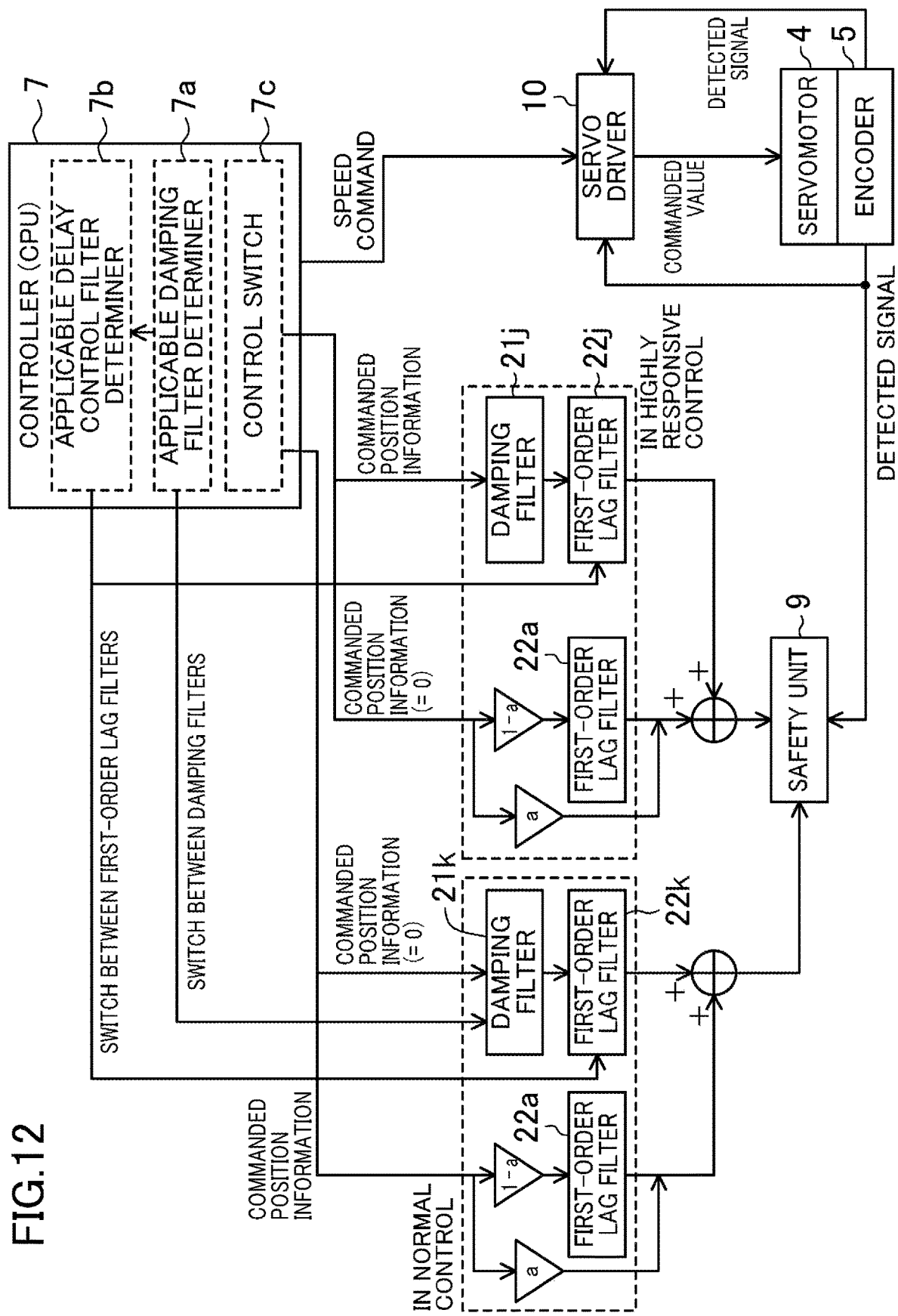
FIG. 12 is a block diagram showing a configuration of a robot controller according to a second variation.

FIG. 12 is a block diagram showing a configuration of a robot controller according to this variation.

In actual control of the robot A, after the controller 7 of the robot controller 2 has output the speed command and the commanded position information, the servo driver 10 actually controls the motor 4. Since the motor 4 operates based on the control, the actual motor position is delayed with respect to the commanded position information by a certain time.

In order to correct this delay, as described above, the first-order lag filter corresponding to the control mode is applied to the commanded position information or a different filter is applied to information including the commanded position information, for processing. However, since the first-order lag filter 22a simply simulates the control delay by the servo driver 10, the accuracy may be improved by the first-order lag.

In the configuration shown in FIG. 12, the first-order lag filter 22a used in the normal control in the configuration shown in FIG. 10 is subjected to feed forward control, which further improves the accuracy by the first-order lag.

As shown in FIG. 12, the commanded position information from the controller 7 is multiplied by the gain of a (1−a) times and applied to the first-order lag filter 22a, for processing. In parallel, the commanded position information is multiplied by the gain of a times. These results are summed up and transmitted to the safety unit 9.

Accordingly, this variation allows highly accurate detection of an abnormality of each encoder, as compared to the configuration described in the third embodiment.

A configuration has been described in this variation where the first-order lag filter 22a is subjected to the feed forward control. The first-order lag filters 22j and 22k may be subjected to the feed forward control similarly, which provides the same or similar advantages.

Fourth Embodiment

Figure 13:
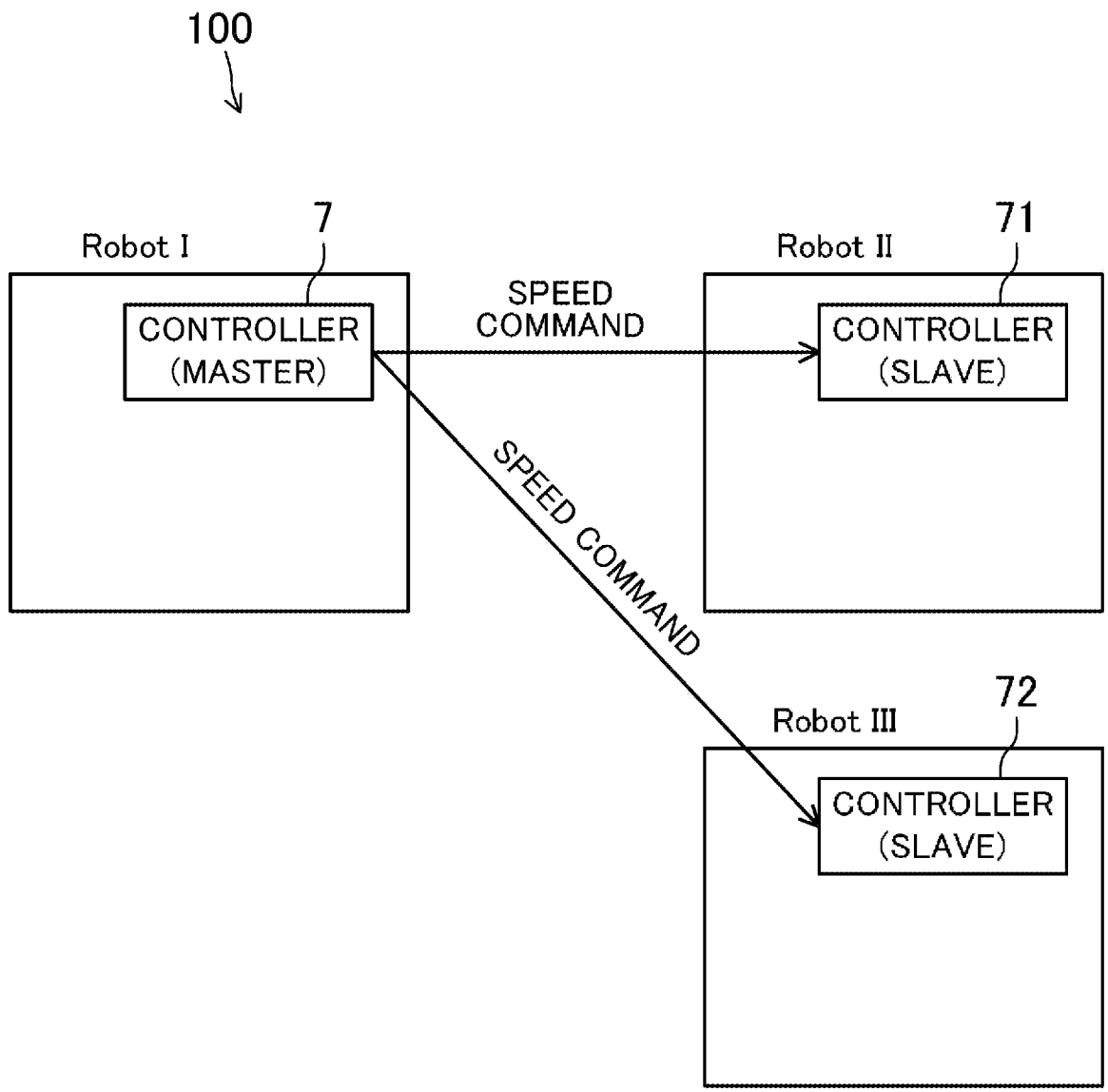
FIG. 13 is a schematic configuration diagram of a robot system according to a fourth embodiment.

FIG. 13 is a schematic configuration diagram of a robot system according to this embodiment.

In processing of components, for example, it is known that a plurality of robots operate in corporation (hereinafter referred to as "cooperative operation"). At this time, as shown in FIG. 13, one or more slave robots are set for a single robot (i.e., a master robot). In this embodiment, a robot I is set as the master robot and two robots II and III are set as the slave robots. In such a robot system 100, the slave robots II and III operate in cooperation with the robot I based on the speed commands transmitted from the controller 7 of the robot I to controller 71 and 72 of the robots II and III. Note that such operation control may be referred to as "cooperative control". The robots I to III have the same or similar configurations to the robots A described in the first to third embodiments.

In the robot system 100 shown in FIG. 13, there is a fear that the motor 4 may be displaced by the difference in responsiveness of the individual robots. To address the problem, the robot system 100 performs matching controls of the cutoff frequencies out of the vibration components in the speed commands usable for the robots. For example, the robot I has a cutoff frequency of 8 Hz, the robot II has a cutoff frequency of 6 Hz, and the robot C has a cutoff frequency of 7 Hz. The robots I to III operate at the lowest cutoff frequency, 6 Hz.

With this configuration, the robot II is subjected to predetermined damping control, whereas the robot I and the robot III operate at frequencies lower than the respective cutoff frequencies, which reduces the vibrations.

However, in the robot system 100 shown in FIG. 13, assume that the damping filter 21 and the first-order lag filter 22 described in the first to third embodiments are applied to the robots I to III. The filter constants of the damping filters 21 included in the robots I to III vary in accordance with the difference in the weight of the attachment loads 13 attached to the robots I to III, respectively. That is, assume that the damping filter 21 with a filter constant different from the one selected for the cooperative control is used. Then, the cutoff frequency of the commanded position information may be improperly set to the safety unit 9 of any of the robots I to III and abnormalities of the encoders 5 may be erroneously detected.

To address the problem, this embodiment suggests setting the damping filter 21 used in the entire robot system 100 before actually activating the robot system 100.

FIG. 14 is a flowchart showing a procedure for setting a damping filter used for the robot system. For the sake of simplicity, only the robots I and II shown in FIG. 13 are picked up.

First, the controller 7 of the robot I determines the damping filter 21 and the first-order lag filter 22 for the robot I (step ST31). In addition, the controller 7 of the robot I determines the damping filter 21 and the first-order lag filter 22 for the robot II (step ST32). Note that the damping filters 21 and the first-order lag filters 22 are determined in steps ST31 and ST32 in the same manner as in the execution procedure according to the flowchart shown in FIG. 5, for example.

Next, the controller 7 of the robot I determines whether or not a cutoff frequency fa is lower than or equal to a cutoff frequency fb (step ST33). The cutoff frequency fa is determined by the weight of the attachment load 13 held by the robot I, whereas the cutoff frequency fb is determined by the weight of the attachment load 13 held by the robot II. If the result of the determination in step ST33 is positive, the damping filter 21 and the first-order lag filter 22 determined in step ST31 are applied to all the robots, the robots I and II in this case, included in the robot system 100 (step ST34). If the result of the determination in step ST33 is negative, the damping filter 21 and the first-order lag filter 22 determined in step ST32 are applied to each of the robots I and II (step ST35).

With this configuration, the cutoff frequencies of the commanded position information corresponding to the weights of the attachment loads 13 held by all the robots of the robot system 100 are compared. The one set of the damping filter 21 and the first-order lag filter 22 corresponding to the lowest cutoff frequency is selected. This reduces erroneous detection of abnormalities of the encoders 5 in the safety unit 9 of each robot, and further improves the accuracy in detecting the abnormalities of the encoders 5.

Other Embodiments

In the switch between the damping filters 21 and between the first-order lag filters 22 shown in FIGS. 5 and 6, the first-order lag filter 22$j$ is selected in correspondence with the damping filter 22$j$. However, as described above, in the first-order lag filter 22 that compensates a delay in the drive control of the motor 4, the time constant is not significantly influenced by the weight of the attachment load 13. Instead of selecting the damping filter 22$j$ using the applicable damping filter determiner 7$a$, the first-order lag filter 22 with a predetermined time constant may be applied to the commanded position information to be transmitted from the controller 7 to the safety unit 9.

The abnormality detection method for detecting an abnormality of the encoder according to the present disclosure allows determination on the abnormality of the encoder—even if a general-purpose encoder is used—under reduced influence on the existing functions or devices. The method is thus particularly useful in determining an abnormality of an encoder for an industrial robot such as a general-purpose welding robot or any other type of operation system.

DESCRIPTION OF REFERENCE CHARACTERS

A, I to III Robot (Operation System)
4 Motor
5 Encoder
7, 71, 72 Controller
7$a$ Applicable Damping Filter Determiner
7$b$ Applicable Delay Filter Determiner
7$c$ Control Switch
9 Safety Unit (Abnormality Detection Device)
10 Servo Driver
12 Joint Axis (Output Shaft)
13 Attachment Load
21, 22$1$ to 22$n$ Damping Filter
22, 22$1$ to 22$n$ First-Order Lag Filter (Delay Control Filter)
92 CPU (Determiner)
94 Encoder Receiver (First Receiver)
95 DPRAM (Second Receiver)
100 Robot System

The invention claimed is:

1. An abnormality detection method for detecting an abnormality of an encoder for sensing a rotational position of a motor that drives an output shaft of an operation system, using
    a controller configured to output a speed command designating the rotational position of the motor, and commanded position information indicating the rotational position of the motor according to the speed command,
    a driver configured to receive the speed command output from the controller and an output signal output from the encoder, and to control drive of the motor based on the speed command and the output signal, and
    an abnormality detection device configured to detect the abnormality of the encoder, the method comprising:
    using the abnormality detection device,
    obtaining corrected position information from the controller and the output signal from the encoder, the corrected position information being obtained by removing a vibration component of the operation system and compensating for a time delay caused by a delay in drive control of the motor; and
    determining, after comparing the corrected position information with detected position information on the motor calculated based on the output signal, the abnormality of the encoder, if there is a difference greater than or equal to a predetermined value between the corrected position information and the detected position information, wherein
    the controller removes, from the commanded position information, the vibration component corresponding to a weight of an attachment load held by the operation system, and compensates for the time delay to obtain the corrected position information.

2. The method of claim 1, further comprising:
    using the controller,
    detecting a switch between drive control modes of the operation system; and
    switching processing routes for the commanded position information in accordance with the switch between the drive control modes, wherein
    the abnormality detection device receives the commanded position information that has been processed through one of the processing routes corresponding to a selected one of the drive control modes, or the corrected position information.

3. The method of claim 2, wherein
an amount of compensation for the time delay of the commanded position information and an amount of compensation for the time delay of the corrected position information vary depending on the switch between the processing routes.

4. The method of claim 1, further comprising:
using the controller,
detecting a switch between drive control modes of the operation system;
switching processing routes for the commanded position information in accordance with the switch between the drive control modes;
processing the commanded position information output from the controller through a first processing route corresponding to a detected actual drive control mode;
processing, as the commanded position information, position information corresponding to an original position of the motor through a second processing route not corresponding to the detected actual drive control mode; and
summing up the commanded position information processed through the first processing route and the corrected position information, and summing up the commanded position information processed through the second processing route and the corrected position information, wherein
the abnormality detection device receives the commanded position information and the corrected position information summed up in the summing.

5. The method of claim 4, further comprising:
compensating for the time delay of the commanded position information through at least one of the first processing route or the second processing route, wherein
feed forward control is performed in the compensating.

6. The method of claim 1, wherein
a safety circuit is further used for an emergency stop of the operation system,
the controller transmits an emergency stop signal to the safety circuit in an emergency, and
in the determining of the abnormality, the abnormality detection device determines no abnormality of the encoder upon detection of an output of the emergency stop signal output from the controller, even if there is a difference greater than or equal to the predetermined value between the corrected position information and the detected position information.

7. The method of claim 1, wherein
the operation system is a robot.

8. An operation control device for controlling a motor that drives an output shaft of an operation system, the device comprising:
a controller configured to output a speed command designating a rotational position of the motor, and commanded position information indicating the rotational position of the motor according to the speed command;
a driver configured to receive the speed command output from the controller and an output signal output from an encoder for sensing the rotational position of the motor, and to control drive of the motor based on the speed command and the output signal;
an abnormality detection device configured to detect an abnormality of the encoder;

a damping filter for removing a vibration component of the operation system from the commanded position information;
a delay control filter for compensating the commanded position information for a time delay caused by a delay in drive control of the motor;
the damping filter including a set of a plurality of damping filters with filter constants different from each other;
the delay control filter including a set of a plurality of delay control filters with time constants different from each other;
the controller including
an applicable damping filter determiner configured to select one of the plurality of damping filters which has one of the filter constants corresponding to a weight of an attachment load held by the operation system; and
the abnormality detection device including
a first receiver configured to receive the output signal from the encoder,
a second receiver configured to receive the commanded position information from the controller or receive corrected position information via the one of the damping filters selected by the applicable damping filter determiner and the delay control filter, and
a determiner configured to compare the corrected position information with detected position information on the motor calculated based on the output signal, and determine that the encoder has the abnormality, if there is a difference greater than or equal to a predetermined value between the corrected position information or the commanded position information and the detected position information.

9. The device of claim 8, wherein
the controller further includes:
an applicable delay control filter determiner configured to select one of the plurality of delay control filters which has one of the time constants corresponding to a filter constant of the one of the damping filters selected by the applicable damping filter determiner, and
the second receiver receives the commanded position information from the controller, or receives the corrected position information via the one of the damping filters selected by the applicable damping filter determiner and the one of the delay control filters selected by the applicable delay control filter determiner.

10. The operation control device of claim 8, wherein
the controller includes a control switch that detects a switch between drive control modes of the operation system, and switches processing routes for the commanded position information transmitted from the controller,
a first delay control filter that compensates for the delay in the drive control of the motor and the damping filter are connected in series between the controller and the second receiver, and a second delay control filter that compensates for the delay in the drive control of the motor is provided in parallel with the first delay control filter, and
the commanded position information is transmitted to the first delay control filter and the damping filter connected in series or the second delay control filter in accordance with the switch between the processing routes by the control switch.

11. The operation control device of claim 10, wherein
the first delay control filter and the second delay control filter have time constants different from each other.

12. A robot comprising at least:
a robot mechanism including at least an output shaft and a motor that drives the output shaft;
an encoder for sensing a rotational position of the motor; and
the operation control device of claim 8 configured to control the drive of the motor and detects the abnormality of the encoder.

13. A robot system comprising: a first robot; and one or more second robots configured to operate in cooperation with the first robot based on command information transmitted from a controller of the first robot;
the first robot and the second robots, each being the robot of claim 12; and
the controller of the first robot configured to
compare a first frequency with a second frequency, the first frequency being a cutoff frequency determined by a weight of an attachment load held by the first robot, the second frequency being a cutoff frequency determined by a weight of an attachment load held by each of the second robots,
apply a set of a damping filter and a delay control filter selected by the first robot to the first robot and the second robots, if the first frequency is equal to or lower than the second frequency, and
apply a set of a damping filter and a delay control filter selected by the second robots to the first robot and the second robots, if the first frequency is higher than the second frequency.

* * * * *